US009060505B2

(12) United States Patent
Rich et al.

(10) Patent No.: US 9,060,505 B2
(45) Date of Patent: *Jun. 23, 2015

(54) CAGE TRAP WITH EASY SET AND RELEASE MECHANISM

(75) Inventors: Christopher T Rich, Leola, PA (US); Robert T. Cruz, Wrightsville, PA (US); Edward J. Holliday, Lititz, PA (US); Marko Lubic, Shillington, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/558,075

(22) Filed: Jul. 25, 2012

(65) Prior Publication Data

US 2013/0047493 A1 Feb. 28, 2013

Related U.S. Application Data

(63) Continuation of application No. 12/149,758, filed on May 7, 2008, now Pat. No. 8,230,641, which is a continuation-in-part of application No. 11/097,195, filed on Apr. 4, 2005, now Pat. No. 7,370,451, application No. 13/558,075, which is a continuation-in-part of application No. 11/600,085, filed on Nov. 16, 2006, now Pat. No. 7,757,427.

(51) Int. Cl.
*A01M 23/00* (2006.01)
*A01M 23/18* (2006.01)

(52) U.S. Cl.
CPC ................................. *A01M 23/18* (2013.01)

(58) Field of Classification Search
USPC .................................................. 43/61, 60, 58
See application file for complete search history.

(56) References Cited

U.S. PATENT DOCUMENTS

| | | | | |
|---|---|---|---|---|
| 2,562,809 A * | 7/1951 | Mogren | | 43/61 |
| 4,682,440 A * | 7/1987 | Hunter | | 43/61 |
| 4,706,406 A * | 11/1987 | Mowatt et al. | | 43/61 |
| 4,912,872 A * | 4/1990 | Wynn et al. | | 43/61 |
| 5,862,624 A * | 1/1999 | Askins | | 43/61 |
| 6,618,982 B2 * | 9/2003 | Lafforthun | | 43/61 |
| 7,370,451 B2 * | 5/2008 | Rich et al. | | 43/61 |
| 8,230,641 B2 * | 7/2012 | Rich et al. | | 43/61 |
| 8,627,595 B2 * | 1/2014 | Radesky et al. | | 43/61 |
| 8,782,946 B2 * | 7/2014 | Bucher | | 43/61 |
| 2013/0047493 A1 * | 2/2013 | Rich et al. | | 43/61 |

* cited by examiner

*Primary Examiner* — Christopher P Ellis
(74) *Attorney, Agent, or Firm* — Jacobson Holman, PLLC

(57) ABSTRACT

A cage type animal trap having an enclosure with an animal access opening into a vacant interior sized to receive an animal to be trapped. The access opening is closed by a door that is movable from a closed to an opened position by an actuating mechanism releasably held by a latch mechanism. The latch mechanism is configured to move between hold and release positions, the hold position moving the door to the opened position and the release position releasing the actuating member to allow the door to close and trap the animal in the animal enclosure.

20 Claims, 24 Drawing Sheets

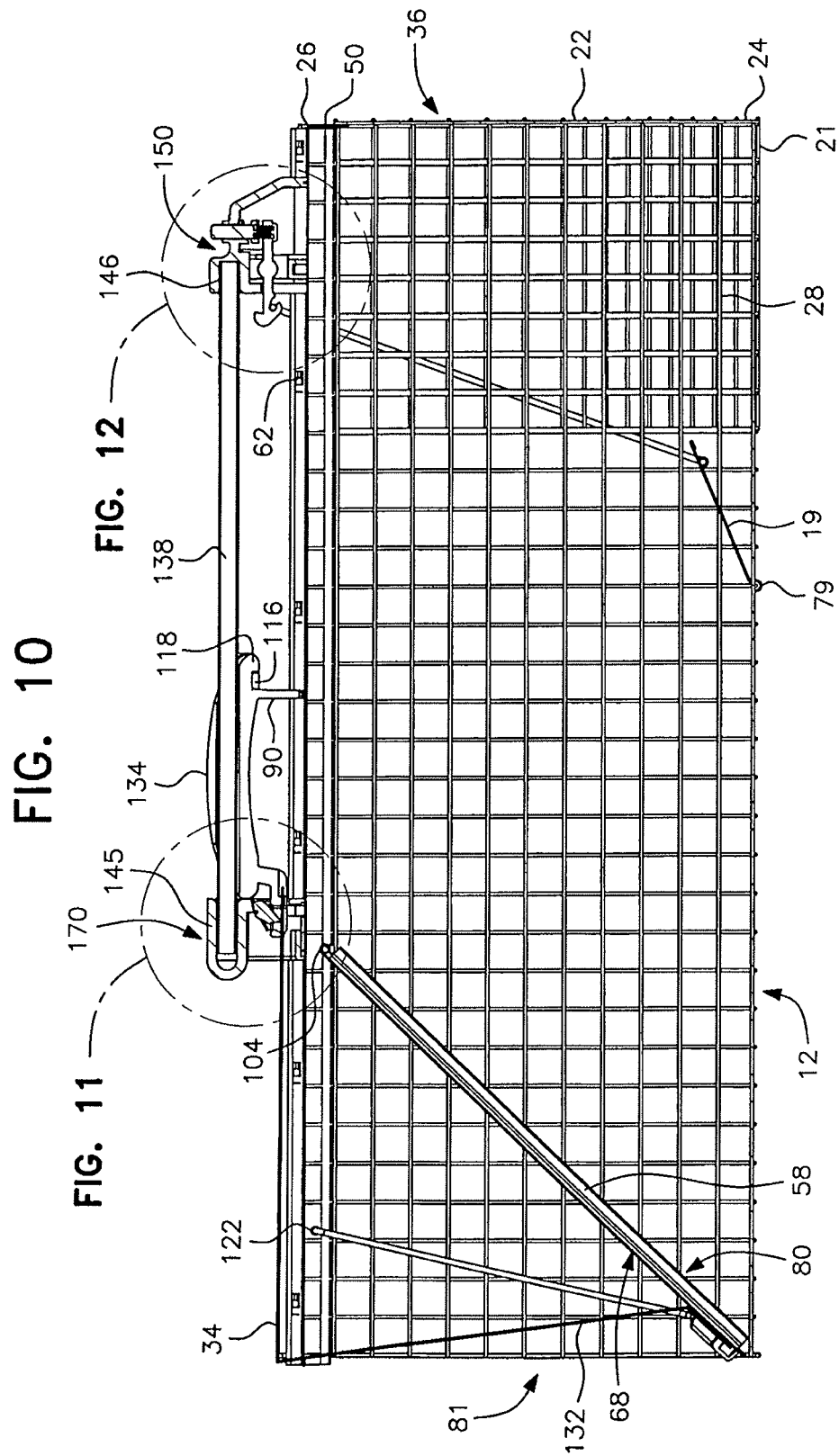

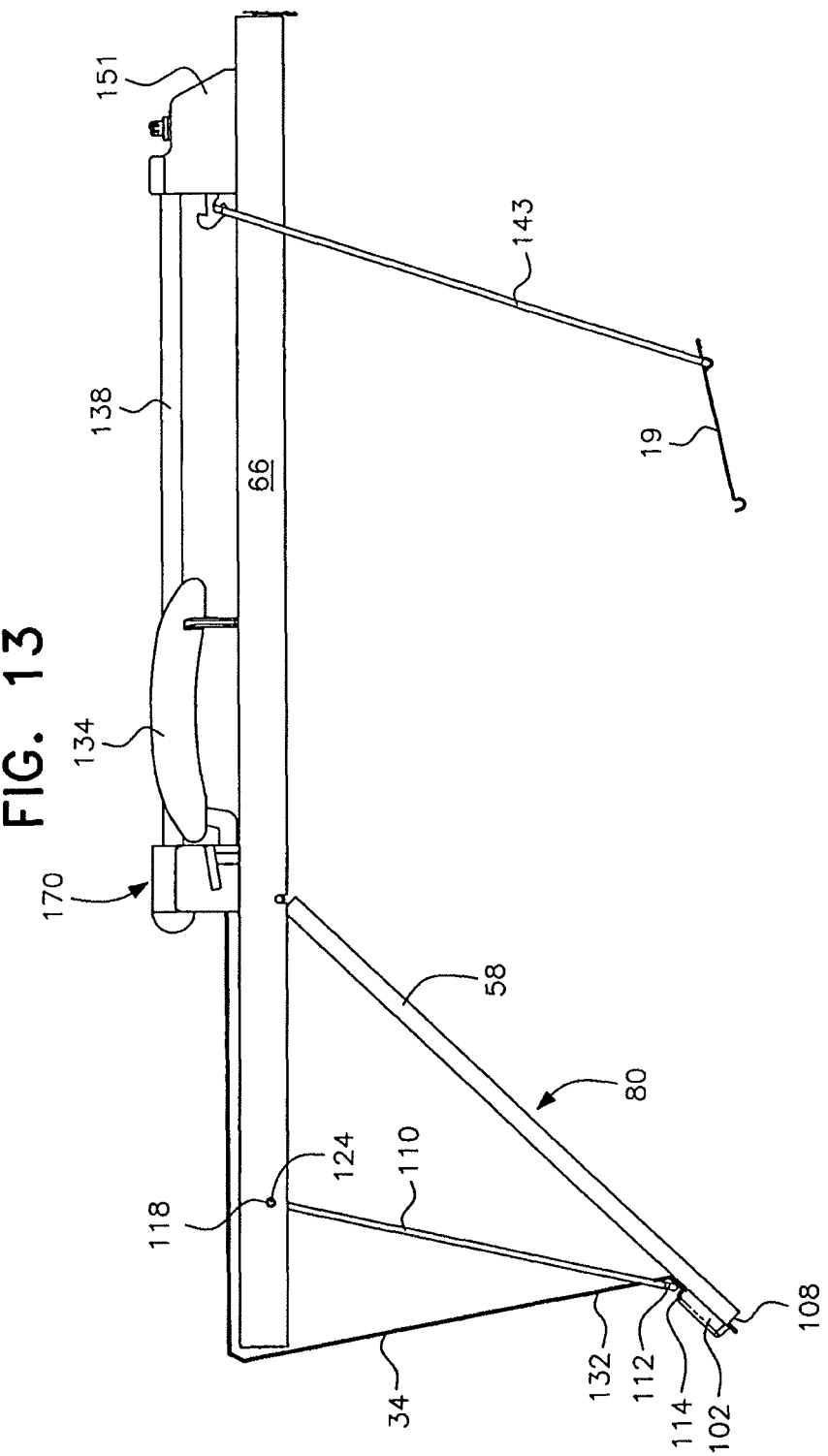

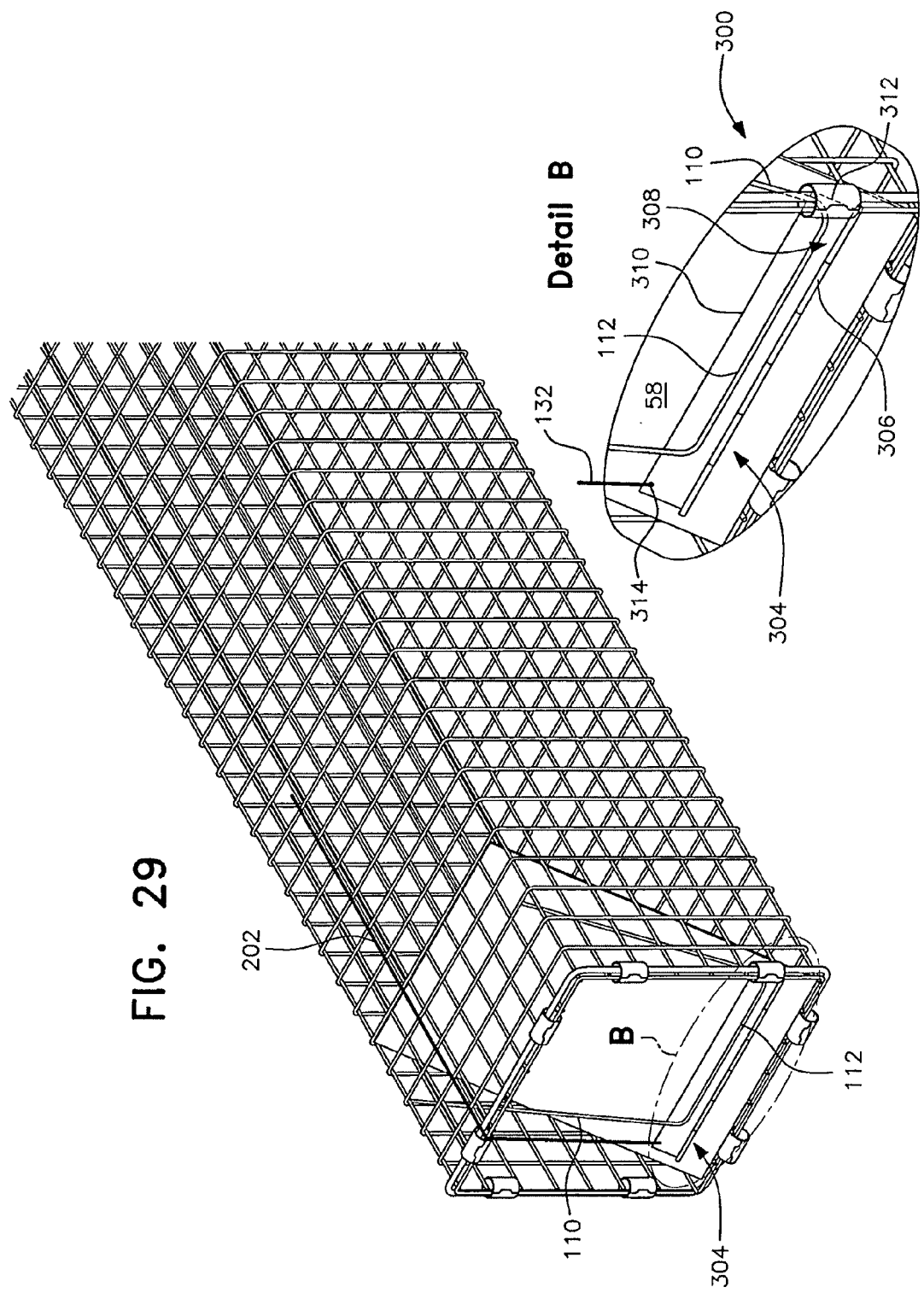

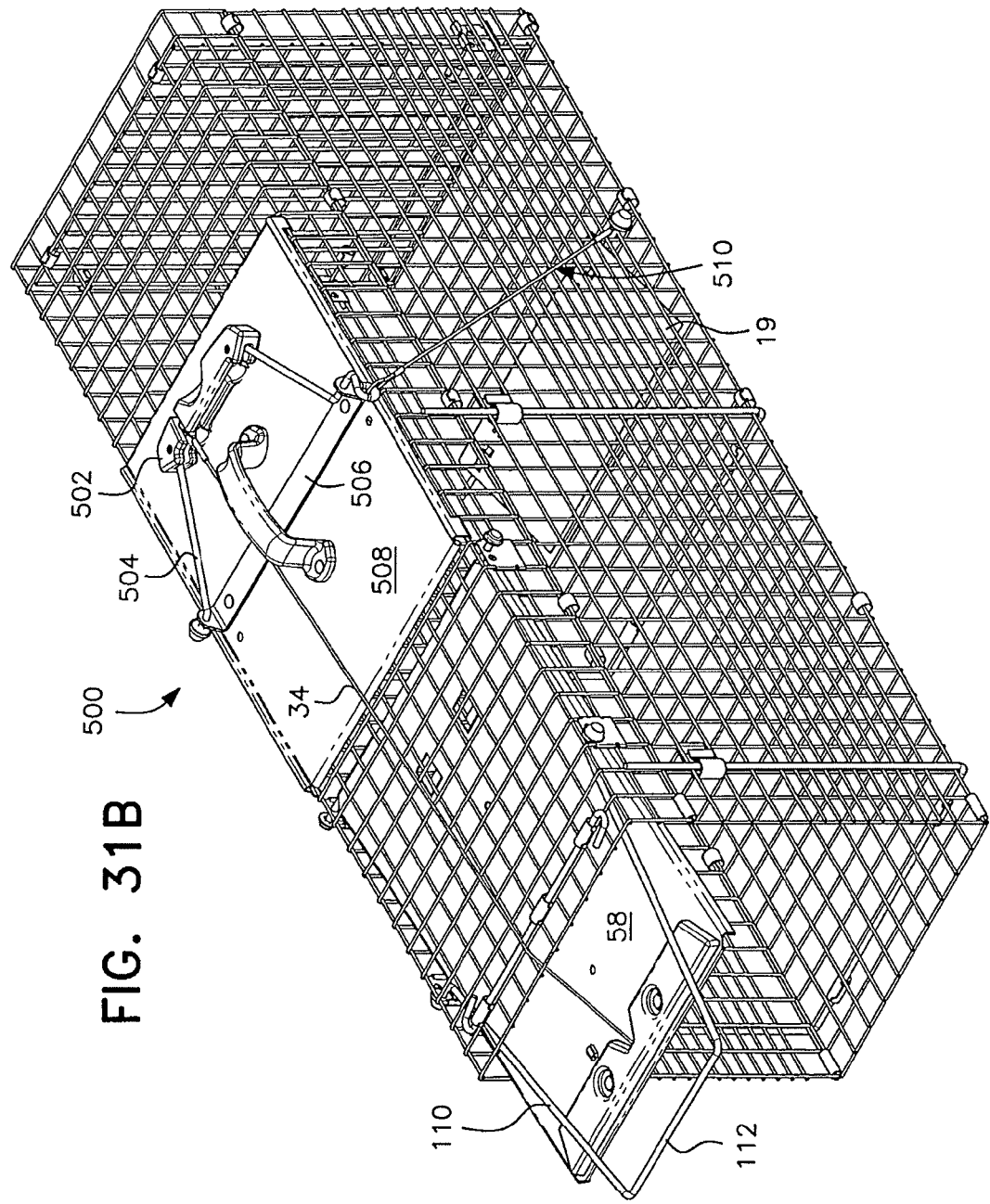

CAGE TRAP WITH EASY SET AND RELEASE MECHANISM

This is a continuation application of application Ser. No. 12/149,758 filed on May 7, 2008, which issues as U.S. Pat. No. 8,230,641 on Jul. 31, 2012, which was a continuation-in-part of prior application Ser. No. 11/097,195 filed on Apr. 4, 2005, now U.S. Pat. No. 7,370,451 and a continuation-in-part of prior application Ser. No. 11/600,085 filed on Nov. 16, 2006, now U.S. Pat. No. 7,757,427, the priority of which is hereby claimed.

BACKGROUND OF THE INVENTION

1. Field of the Invention

This invention relates to cage-type animal traps of the kind generally used outdoors for trapping small to medium sized animals without harming the trapped animal. Such traps commonly comprise a cage of metal wire mesh or the like with a door held open by a trigger mechanism until an animal is lured into the trap by suitable pre-inserted bait. After the animal enters the interior of the trap, the animal's weight pressed against the trigger actuates a trip which releases and closes the door, thereby trapping the animal inside the cage.

2. Description of the Prior Art

Cage traps of the prior art have specific setting and releasing mechanisms which typically consist of a pan, a trigger rod, a latching device, a door, a locking device and sometimes a spring member. To set the trap, the locking device must be disengaged. A door is then opened and a latch is set. The location of each of these components on the trap requires the use of two hands. In order to release the trapped animal, once again the locking device must be disengaged, the door must be open and the latch set. Again, these steps require the use of two hands and involve close contact with the animal. There is thus a need for a cage-type trap that provides the user with an easy, essentially one-handed method of setting the trap. There is also a need for a cage-type trap where the user can easily release a trapped animal without subjecting the user to close contact with the trapped animal.

Another problem with the prior art cage traps is the trigger or actuation mechanism used to initiate the door closure. There is thus a need for a system for providing an adjustable trigger which is sensitive to weight thereby distinguishing among large and small animals so that the trap will not be inadvertently tripped by a small animal that is not a target of the trap.

Prior art cage traps relying on cable mechanisms also present difficulties associated with keeping the cage trap door closed once an animal is inside. There is thus a need for a system that provides a door lock mechanism which is reliable in operation with a cable-type cage trap to ensure the door remains locked until the user initiates release of the trapped animal, and which releases easily and quickly.

It is to the solution of these and other problems that the present invention is directed.

SUMMARY OF THE INVENTION

The present invention is directed to a cage-type animal trap that includes a wire mesh animal enclosure made up of a base, a pair of opposed sidewalls emanating from the base, a rear wall secured to the sidewalls and the base, a roof secured to the tops of the sidewalls and the rear wall, and a front end provided with an animal access opening defined by the base, sidewalls, and roof. A door is movably mounted at the front end and operates in an opened position to reveal the animal access opening and in a closed position to block the animal access opening. An elongated rail is positioned on the roof along the longitudinal axis of the roof.

A hand grip is mounted on the rail to move bi-directionally between a first position toward the front end of the trap and a second position toward the rear wall of the trap. An actuating mechanism having a flexible actuating member has one end secured to the bottom of the door and another end secured to the hand grip. As such, when the hand grip is in the first position forwardly on the rail, the door is in the closed position and, when the hand grip is in the second position rearwardly on the rail, the door is in the opened position with tension on the actuating member. A latch mechanism is mounted at the rear end of the trap to releasably hold the hand grip in its second position and to maintain the tension on the actuating mechanism.

The trip mechanism is in the form of a pedal movably mounted in the animal enclosure with a trigger rod secured to the pedal and to the latch mechanism. When an animal enters the animal enclosure, the weight of the animal moves the pedal from a first raised position to a second lowered position for causing the trigger rod to move the latch mechanism thereby releasing the hand grip. Releasing the hand grip results in release of the tension on the actuating member and movement of the hand grip from its second position to its first position. The weight of the door moves the door from the opened position to the closed position thereby trapping the animal in the animal enclosure.

A pedal mechanism is located at the front end of the trap to lock the hand grip in its first position when the door is in the closed position. A door lock is positioned at the bottom of the door to prevent the door from being opened from inside the trap by a trapped animal. Finally, an adjustment mechanism is provided at the rear of the trap to allow the user to adjust the weight sensitivity of the pedal so that only an animal of predetermined weight can move the pedal to trip the trap.

The animal trap can alternatively be configured with a separate mechanism for tensioning the actuating member, such as a cable reel, a crank, or other mechanism suitable for this purpose as would be known by persons of ordinary skill in the art. In this case, the hand grip could be eliminated. Movement of the pedal would then release the actuating member tensioning mechanism, with the remainder of the door closing operation being the same as already described.

It is thus an object of the present invention to provide a cage trap having an improved mechanism for safely and easily setting the trap.

It is a further object of the present invention to provide a cage trap having an improved mechanism for safely and easily releasing an animal from the trap.

It is another object of the present invention to provide a cage trap which can be safely and easily set, and from which a trapped animal can be safely and easily released by the user using only one hand.

It is yet another object of the present invention to provide a cage trap having an improved mechanism for distinguishing among animals of different weights so that the trap will only trip if an animal exceeds a predetermined weight.

It is still another object of the present invention to provide a cage trap having a door lock that works effectively with a flexible actuating member to prevent a trapped animal from opening the trap door and escaping from the trap.

It is a further object of the present invention to provide a cage trap having a door lock in accordance with the preceding object that releases easily and quickly in response to tension placed on the flexible actuating member.

Additional objects of the invention include, for example, the provision of a cage trap which is durable, reliable and user friendly, which is animal friendly and which traps the animal safely in a humane manner, and which can be manufactured from readily available components and in a cost-effective manner.

BRIEF DESCRIPTION OF THE DRAWINGS

Other objects, features and advantages of the present invention will be apparent to those skilled in the art upon a reading of this specification including the accompanying drawings. While intending to illustrate the invention, the drawings are not necessarily to scale.

FIG. 2A is an enlarged view of the detail highlighted in FIG. 2.

FIG. 10 is a view taken along lines 10-10 of FIG. 9.

FIG. 13 is a right side view of the embodiment of FIG. 1 with the wire mesh removed to more clearly show the trap in a tripped position.

FIG. 29 is a perspective view of another alternate embodiment of the actuating mechanism and door lock shown with the trap in a tripped position with the door closed.

FIG. 31B is a perspective view of the trap of FIG. 31A in a set position with the door open.

DETAILED DESCRIPTION OF THE PREFERRED EMBODIMENTS

Figure 1:
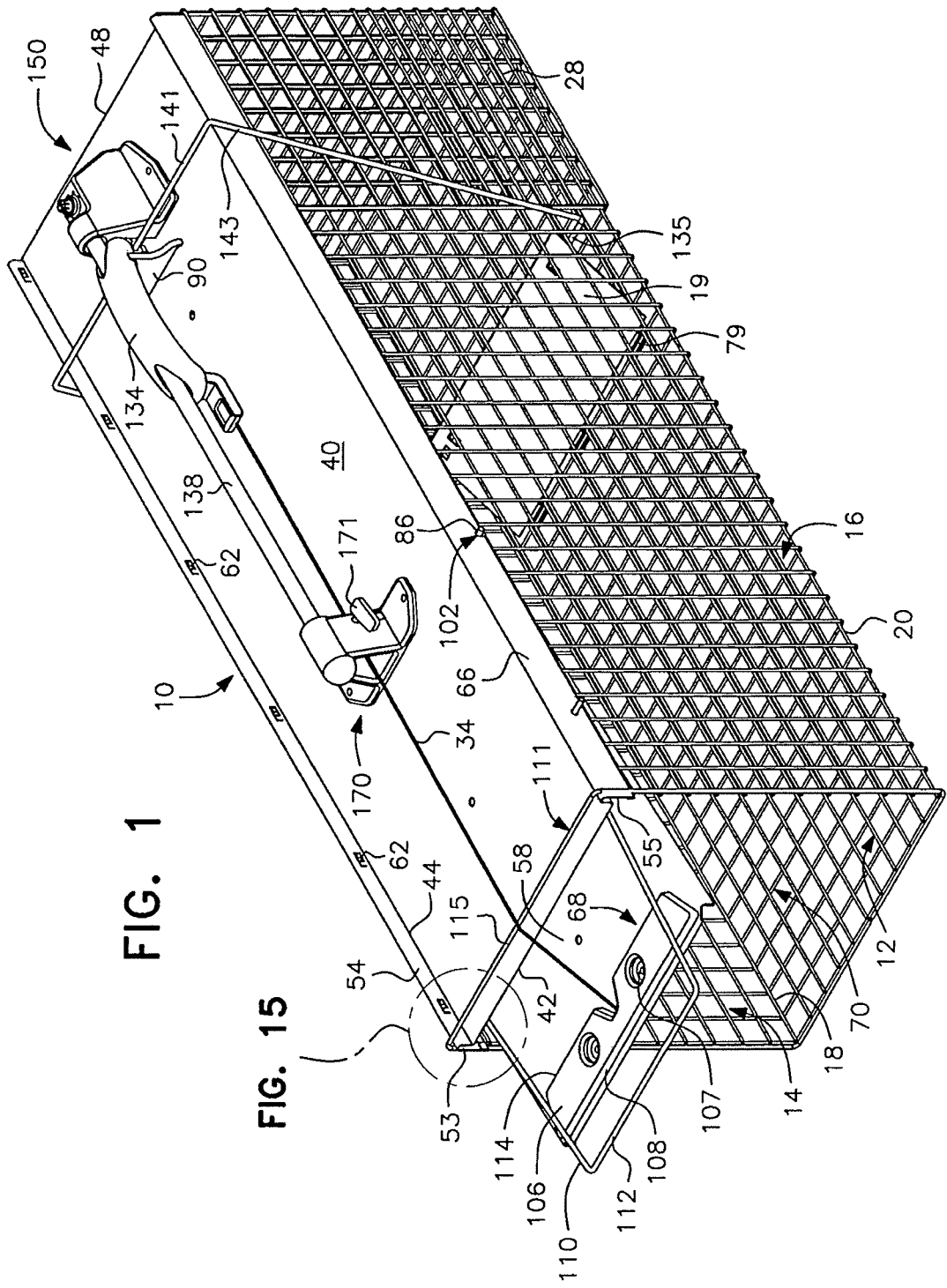
FIG. 1 is a perspective view of a preferred embodiment of the present inventive trap in a set position with the door of the trap opened.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

With reference to FIGS. 1 to 3, 7 and 8, the cage trap of the present invention is generally designated by reference numeral 10. Trap 10 includes a box-like cage having an elongated base 12 and opposed sidewalls 14 and 16 preferably formed and folded from a single piece of wire mesh. The sidewalls emanate from the longitudinal edges 18 and 20 of the base 12 in an upward direction. The walls 14 and 16 define planes that are essentially parallel to each other.

Figure 3:
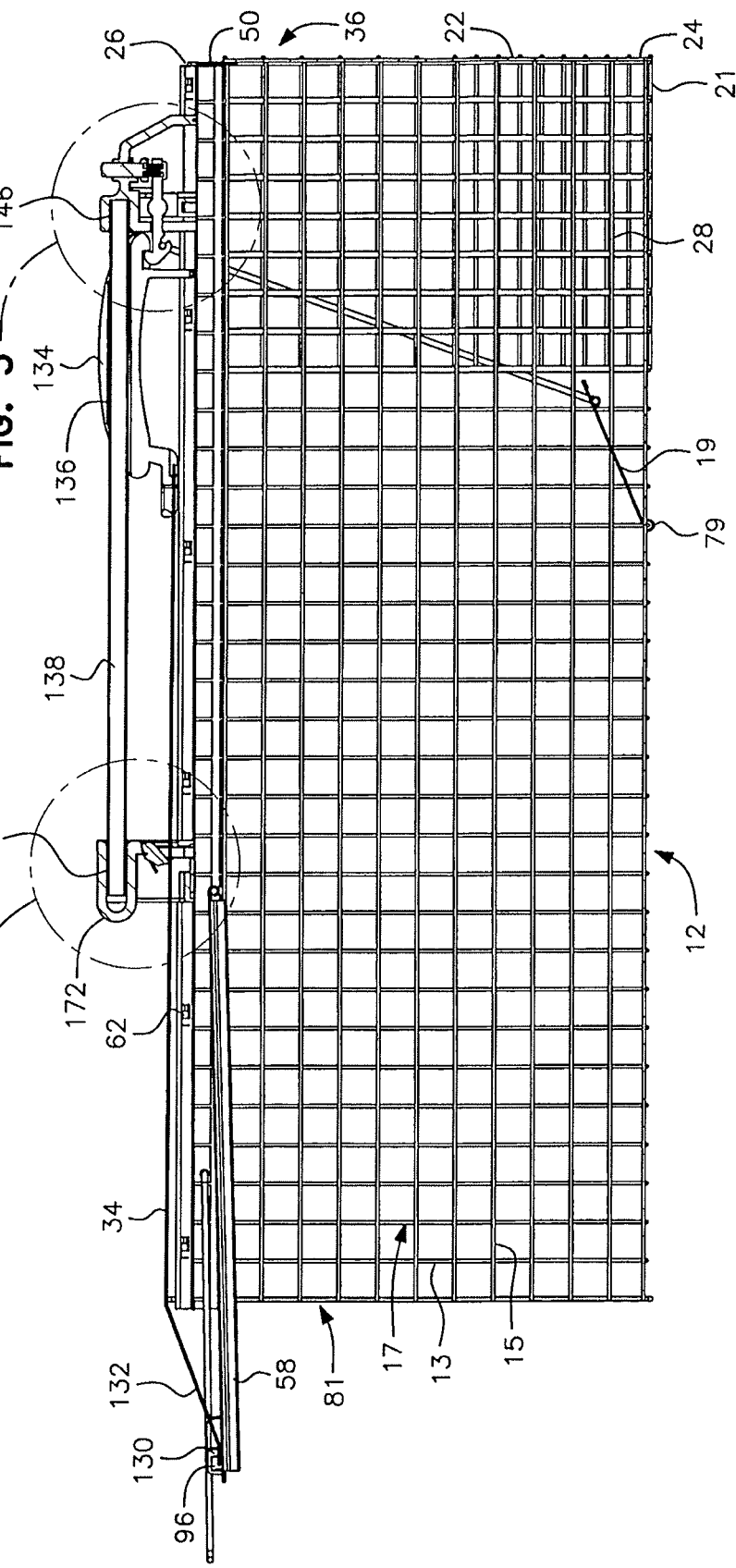
FIG. 3 is a view taken along lines 3-3 of FIG. 2.
Figure 4:
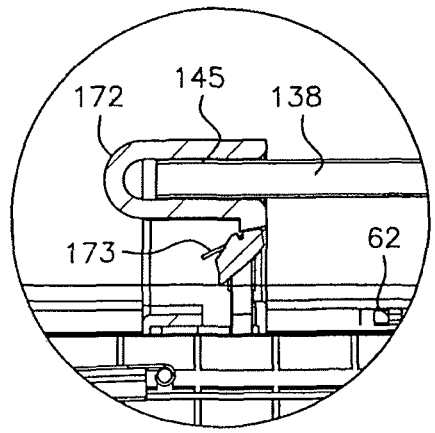
FIG. 4 is an enlarged view of the detail highlighted in FIG. 3.

As seen particularly in FIGS. 1 and 3, in the preferred form of the invention, the base 12 and side walls 14, 16 include wire elements 13, 15 welded at their crossing points to form generally rectangular apertures 17, with the side walls bent up at right angles from the base. The rectangular apertures are approximately 1" square.

The rear wall structure 36 of the trap is also made from a sheet of wire mesh in a generally rectangular configuration to form rear wall 22, having a bottom edge 24 and a top edge 26, and two sidewalls 28 and 30.

Figure 14:
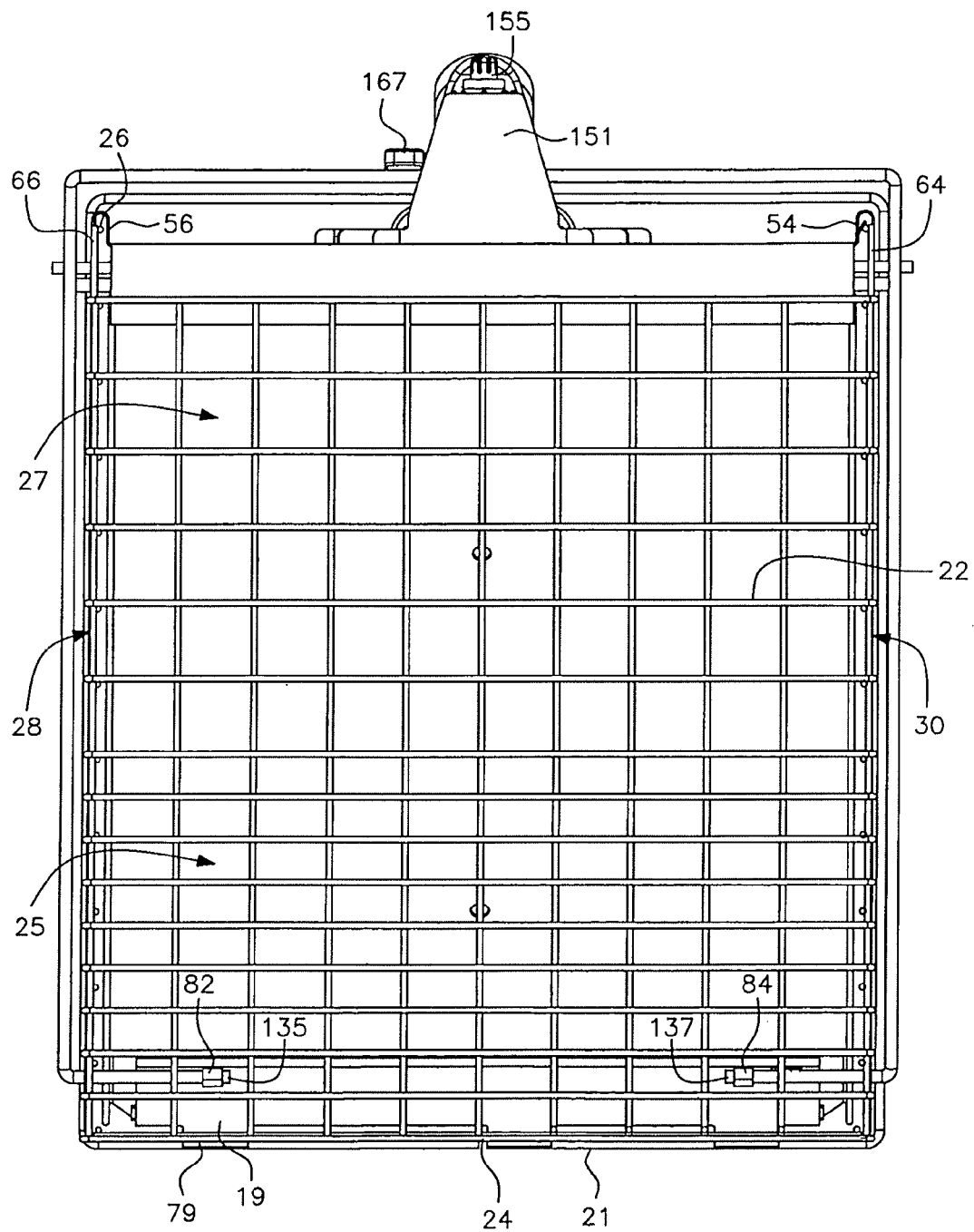
FIG. 14 is a rear plan view of the embodiment of FIG. 1.

The two side walls 28 and 30 emanate perpendicular to and away from the rear wall. As shown in FIG. 14, the lower half of walls 22, 28 and 30 of the wire mesh contains openings 25 that are approximately ½" by 1". The top half of the same walls of the wire mesh contains openings 27 which are approximately 1" square.

The rear wall structure 36 is positioned so that the bottom edge 24 mates with the rear edge 21 of base 12. In like manner, the rear sidewalls 28 and 30 overlap the base sidewalls 14 and 16.

Figure 26:
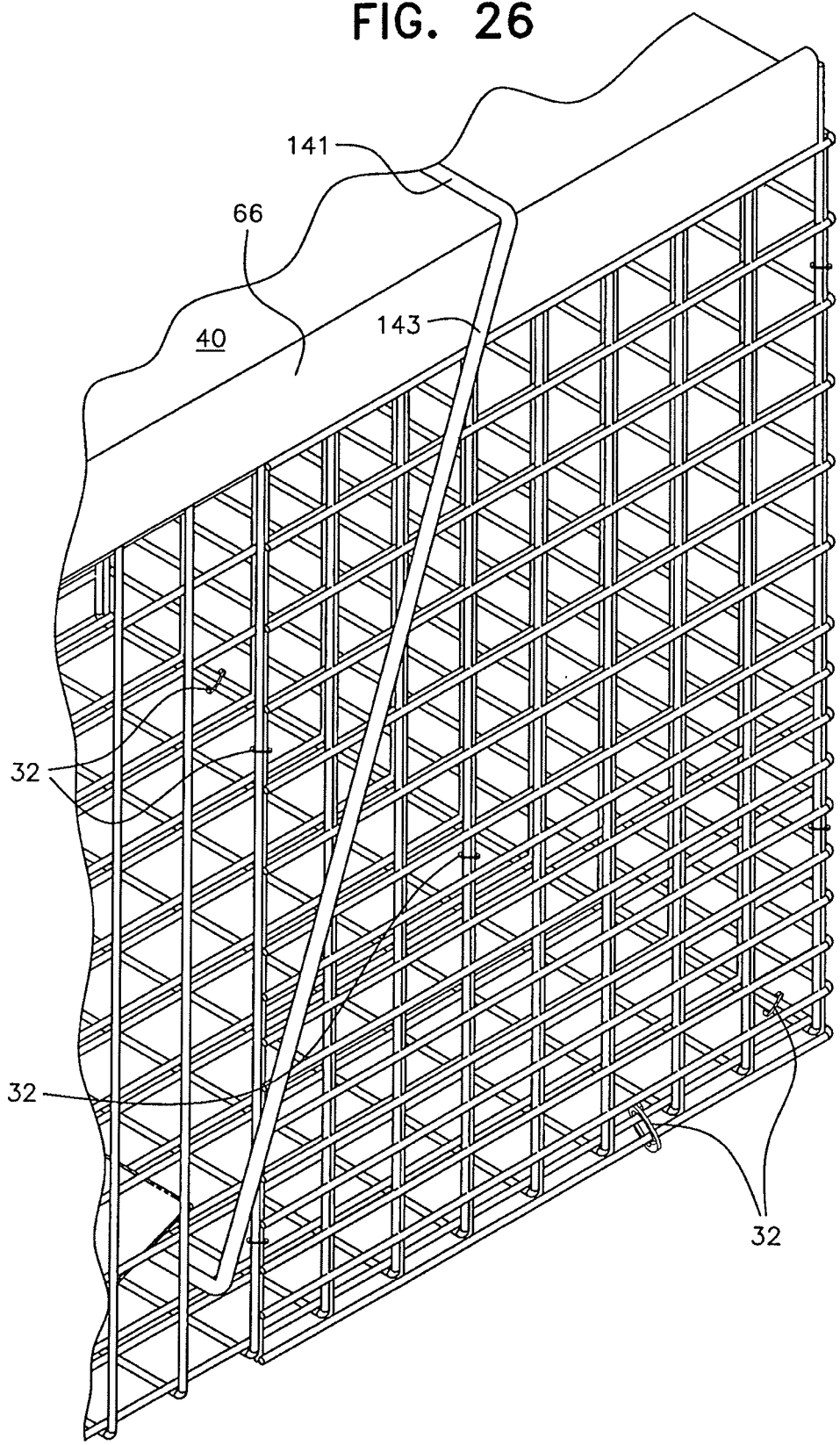
FIG. 26 is a fragmentary view of a sidewall showing the use of crimped rings to assemble the cage walls in the embodiment of FIG. 1.

The rear wall structure 36 is attached to the base wall structure through the use of a series of circular wire rings that are strategically crimped in place as shown, for example, by crimped rings 32 in FIG. 26. For ease of review, the crimped rings are only shown in FIG. 26 with the realization that they are present in all of the views of the wire mesh. Further, the arrangement of the crimped rings 32 in FIG. 26 is by way of example. Any arrangements of the rings that hold the wire mesh together are contemplated.

Figure 2:
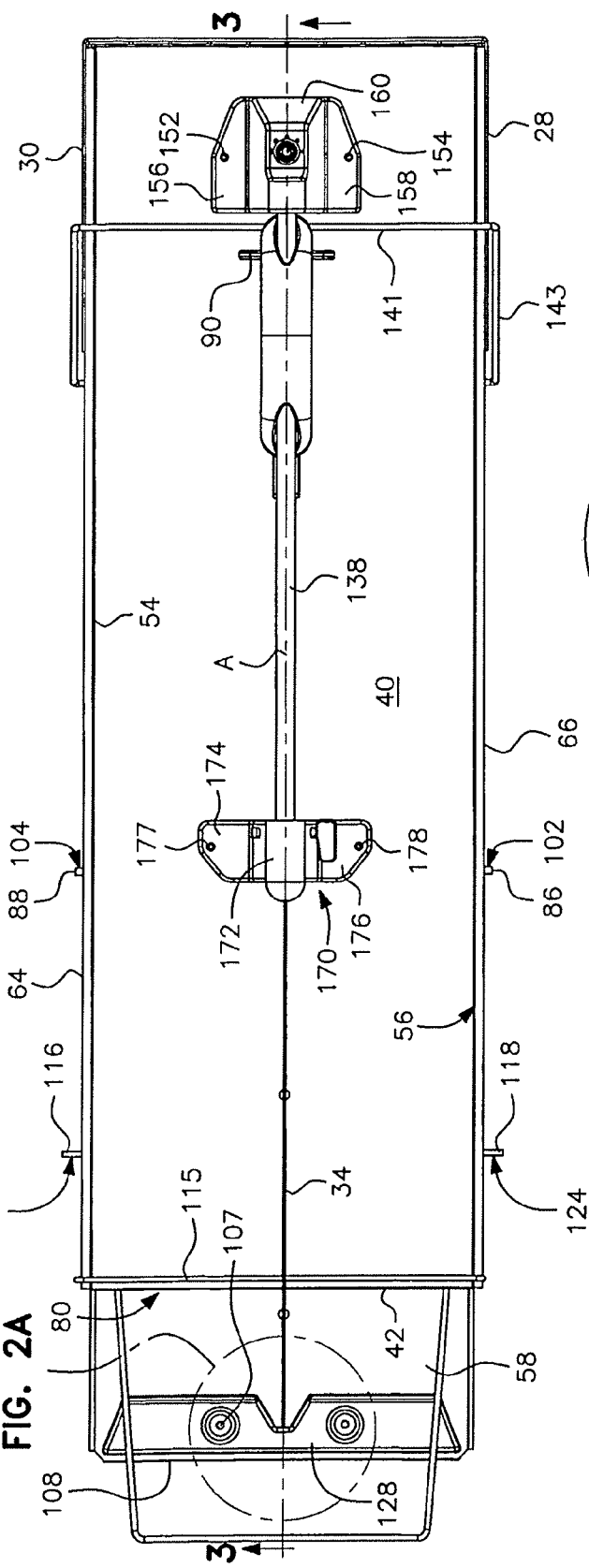
FIG. 2 is a top plan view of the embodiment of FIG. 1.

The basic cage structure is completed through the mounting of an elongated cover or roof 40 which may preferably be stamped from sheet metal. As shown in FIGS. 1, 2 and 14, the rectangular roof generally consists of a piece of sheet metal formed to provide a front edge 42, side edges 44 and 46, and rear edge 48. The sheet metal is bent at the rear edge 48 to provide a downwardly extending rectangular shaped flange 50 that is integral with the full length of the transverse edge 48.

Figure 15:
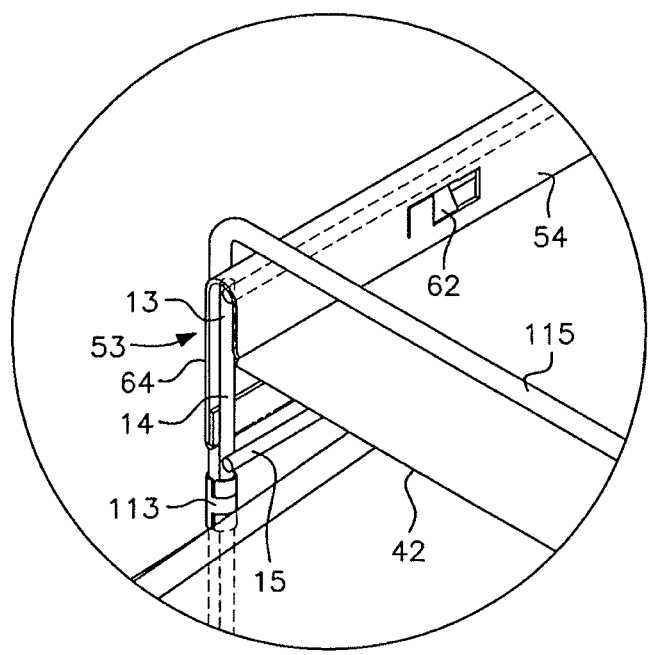
FIG. 15 is an enlarged view of the detail highlighted in FIG. 1.
Figure 25:
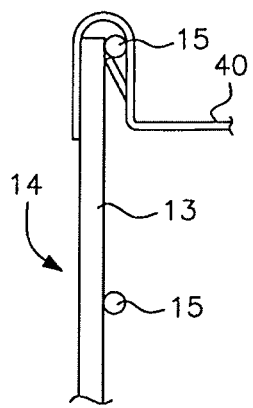
FIG. 25 is a fragmentary side elevational view illustrating the manner in which the clip elements of the roof in the embodiment of FIG. 1 are engaged with the wire mesh at the upper edge portions of a side wall of the cage housing.

The sheet metal is also bent upwardly at the side edges 44 and 46 to provide upwardly extending flanges 54 and 56 and then bent downwardly to form longitudinally extending flanges 64 and 66 that span the full lengths of the longitudinal side edges 44 and 46, respectively. With reference to FIGS. 1, 15 and 25, the flange pairs 54-64 and 56-66 define elongated channels 53 and 55 that fit over and receive the top edges of walls 14 and 16, respectively.

Figure 24:
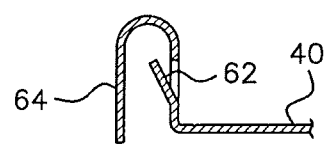
FIG. 24 is an enlarged fragmentary cross-sectional view of an edge portion of the roof in the embodiment of FIG. 1, showing integral clip elements used to secure the roof to the upper edge portions of the side walls.

Defined along the surface of flange 54 of the cover 40 are a series of stamped tabs 62 (FIGS. 1, 24 and 25). Similar tabs 62 are defined along the surface of flange 56 of the roof.

With reference to FIGS. 1, 2 and 14, the roof 40 is positioned and secured to the previously assembled wire mesh structure in the following manner. The elongated cover 40 is positioned so that the longitudinally extending channels 53 and 55 receive the top portions of the side walls 14 and 16 and the rear wall 22. As shown in FIGS. 15 and 25, using side wall 14 as an example, the top portion of the side wall is positioned within the channel 53 defined by flanges 54 and 64. The bendable tabs 62 are then pressed inwardly (FIGS. 24 and 25) in the direction of flange 64 and in this way, the bent tabs capture the upper portion of the side wall 14 so that it cannot be separated from the roof structure. Similar action takes place with regard to the bendable tabs 62 of flanges 56 and 66 in order to secure the top portion of side wall 16 to the cover. The rear depending flange 50 extends over the top portion of the rear wall 22 to provide a cover therefor.

A shown in FIGS. 1 and 15, a wire re-enforcing frame 111 is secured about the opening 81 of the cage to the wire mesh of the cage by suitably spaced bent fasteners 113. The top 115 of the wire frame 111 spans across the top of each flange 54 and 64 to provide a support for a flexible actuating member such as an actuating cable 34. When fully assembled, the various elements constituting the cage define a vacant interior 70 for receiving an animal that is to be trapped.

Figure 16:
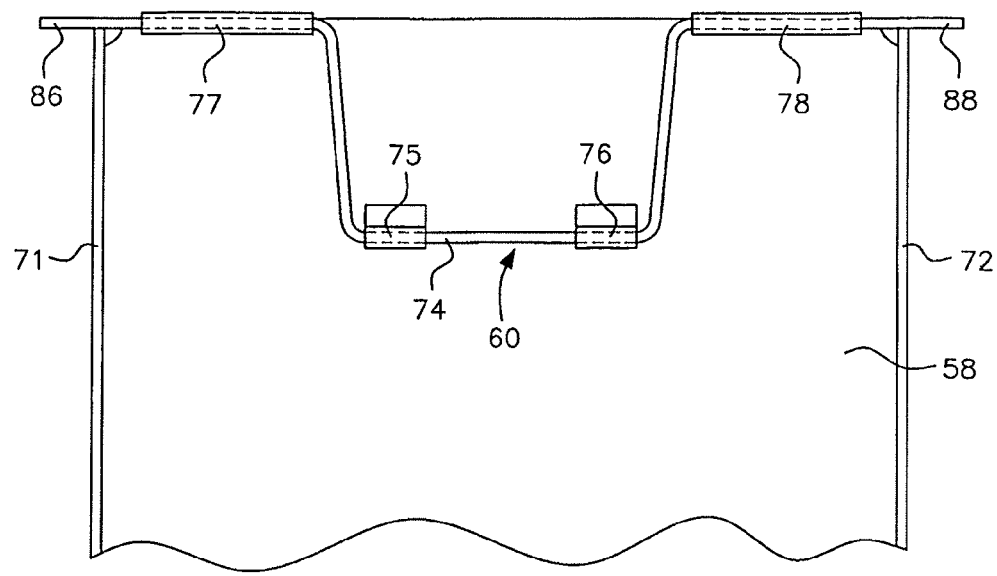
FIG. 16 is a plan view showing how a pivot structure is mounted to the top of the door forming part of the embodiment of FIG. 1.
Figure 17:
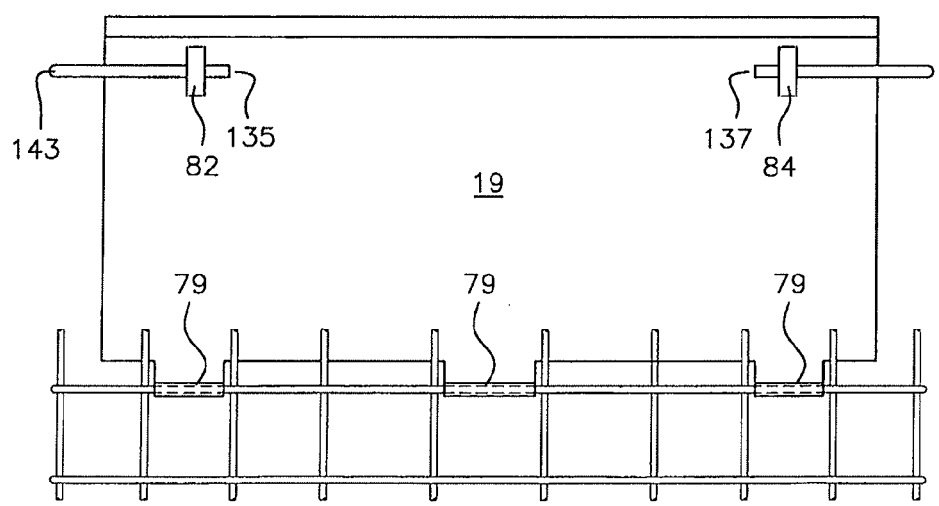
FIG. 17 is a plan view showing how a pivot structure is mounted to the top of the pedal forming part of the embodiment of FIG. 1.

In order to hold an animal within the enclosure, a trap door mechanism must be provided. Such a mechanism is illustrated in FIGS. 1, 2, 10, 16, and 18. The trap door mechanism, generally designated by reference numeral 80, includes an elongated door 58 preferably made of sheet metal. With reference to FIG. 16, the upper portion of the door 58 contains a yoke 60 that is generally U-shaped with straight leg portions 86 and 88 extending outwardly beyond the side edges 71 and 72 of the door panel. The lower portion 74 of the yoke is secured to the door panel through the use of bent tabs 75 and 76 formed in the door. The straight leg portions of the yoke are secured to the side edges of the door panel through the use of bent tabs 77 and 78 also formed in the door. With reference to FIGS. 1 and 2, the cylindrically-shaped ends 86 and 88 of the yoke 60 are received in mounting holes 102 and 104 defined in the flange portions 56 and 66. The holes 102 and 104 are positioned aft of the front opening 81 of the cage about one-third of the length of the longitudinal axis of the cage.

A door lock plate 106 is positioned horizontally and secured by fasteners 107 along the lower edge 108 of the door panel. Alternatively, the lock plate 106 could be an integral component of the door 58 if stamped or otherwise formed in the door. A rectangular-shaped locking wire yoke 110 has a lower portion 112 which wedges up against the corner created by the upper edge 114 of the door lock plate 106 and the outer surface 68 of the door when the door is in the closed position. See FIGS. 8, 28 and 29. The ends 116 and 118 of the yoke are rotatably positioned in mounting holes 122 and 124, respectively, provided in the flanges 56 and 66. The mounting holes 122 and 124 are located forward of the mounting holes 102 and 104 provided for the door and aft of the front end 81 of the trap. A torsion wire spring 126 is provided to bias the yoke in a downward direction toward the door. See FIG. 18.

According to the embodiment shown in FIG. 2A, the bottom portion 128 of the door lock plate 106 contains a transversely extending hole 130 which receives one end 132 of the actuating cable 34. The cable 34 passes beneath the bottom of the yoke 110 and over the surface 68 of the door panel in an upward direction to pass over the top 115 of the wire frame 111 and over the cover 40. The cable is held in place on bottom portion 128 by crimp 96.

Figure 28:
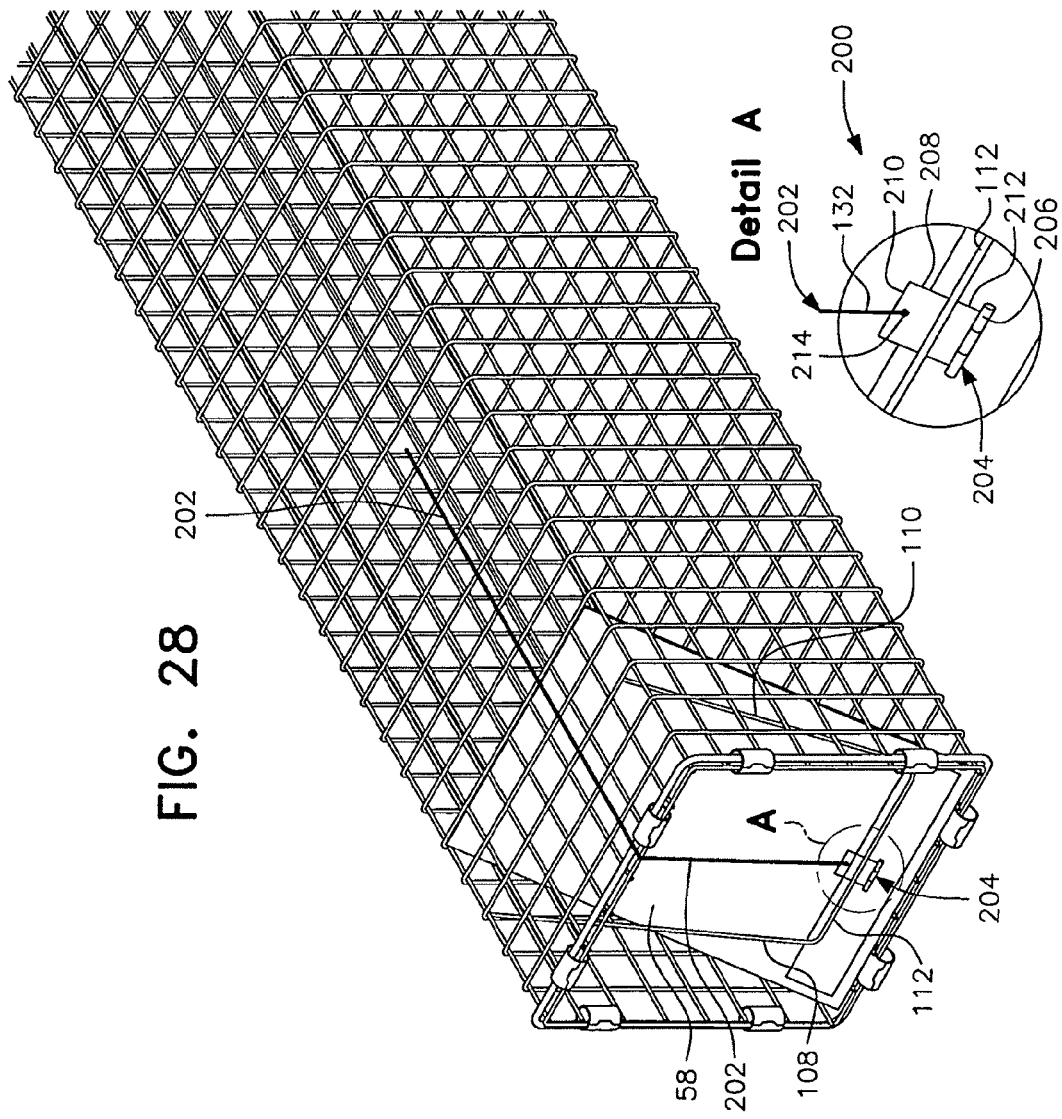
FIG. 28 is a perspective view of an alternate embodiment of the actuating mechanism and door lock shown with the trap in a tripped position with the door closed.

In an alternative embodiment shown in FIG. 28, an actuating mechanism, generally designated by the reference numeral 200, includes a flexible actuating member 202 and a hinged member generally designated by the reference numeral 204. The hinged member 204 includes a hinge 206 that is secured to the door 58 adjacent the lower edge 108 thereof, and a flap 208 having a free end 210 and an opposite edge 212 joined to the hinge 206. An aperture 214 in the free end 210 of the flap 208 receives the first end 132 of the flexible actuating member 202. The flexible actuating member 202 may be embodied as a cable, a chain such as a bicycle chain, a cord, a rope, etc. Hence, the flap 208 lies underneath the bottom 112 of the yoke 110 and the flexible actuating member 202 is secured to the free end 210 of the flap 208. The hinge 206 is secured to the door 58 using any conventional means known to secure hinged elements to a supporting surface.

A further alternative embodiment is shown in FIG. 29 and, since many of the components correspond with those in FIG. 28, these corresponding components are identified by reference numerals that start with "3" instead of "2" and discussion will be limited to those components which are different from the FIG. 28 embodiment.

In the further alternative embodiment of FIG. 29, the hinged member, generally designated by the reference numeral 304, includes a panel 308 that extends substantially across the width of the door 58. The hinge 306 of the hinged member 304 is secured to the door in a manner similar to the hinge 206 flap of the hinged member 204. The flexible actuating member 202 can be secured to a central portion of the door panel (not shown but in a position similar to the connection shown between the actuating member 202 and the flap 208 in FIG. 28), or to an edge area 314 of the door 58 as shown in FIG. 29. When coupled to the edge area 314, the flexible actuating member 202 is directed across the top of the trap along one side, rather than centrally. This off-center positioning of the actuating member 202 is best accommodated through an actuating member tensioning mechanism other than the hand grip embodiment, e.g., through the use of a hand crank, cable reel, etc., that can be positioned along the top of the trap so as to have an offset input for drawing in and releasing the actuating member.

In both embodiments set forth in FIGS. 28 and 29, tensioning of the actuating member 202 lifts the hinged member 204, 304 to release the yoke 110. By eliminating any need for the actuating member to pass under bottom portion 112 of the yoke 110, frictional resistance between the flexible actuating member and the yoke is avoided along with resulting wear on the actuating member arising from the process of opening the trap repeatedly over months or years of use. As both the yoke 110 and the hinged member 204, 304 are preferably made of metal, the resulting metal against metal contact of the hinged member with the yoke provides excellent durability and minimal friction that might otherwise interfere with unhindered sliding of the actuating member against the yoke, and easy release thereof, when the actuating member is tensioned.

With reference to FIGS. 1-5, a rear latch assembly, generally designated by reference numeral 150, is mounted on top of the roof 40 along the trap longitudinal axis A. The rear latch assembly 150 includes a pair of spaced mounting holes 152 and 154 defined on wing portions 156 and 158 emanating from a housing 160. The assembly is fastened to the rear portion of the roof with suitable fasteners such as screws or the like (not shown) passing through the mounting holes. Mounted about a third of the distance aft of the front 81 of the trap also along the longitudinal axis A is a front actuating assembly, generally designated by reference numeral 170. This assembly contains a housing 172 from which emanates mounting wings 174 and 176 that contain holes 177 and 178 for receiving mounting screws or the like (not shown).

As best seen in FIG. 3, the top portions of both the front actuating assembly 170 and the rear latch assembly 150 include cylindrical bores 145 and 146, respectively, which are arranged spaced from and generally parallel to the longitudinal axis A of the roof. These bores are shaped to receive an elongated cylindrically shaped rod 138. An elongated hand grip 134 contains a bore 136 through its longitudinal axis. This bore is sized so that grip 134 may be slidably mounted on the rod 138.

Figure 11:
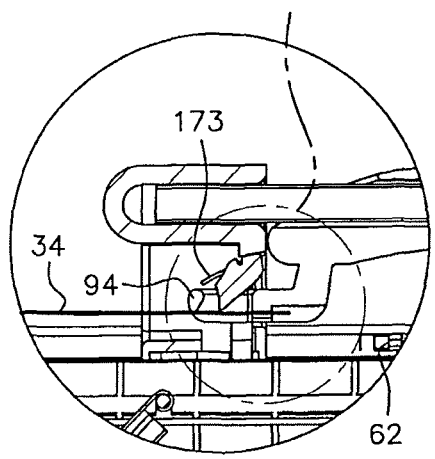
FIG. 11 is an enlarged view of the detail highlighted in FIG. 10.
Figure 12:
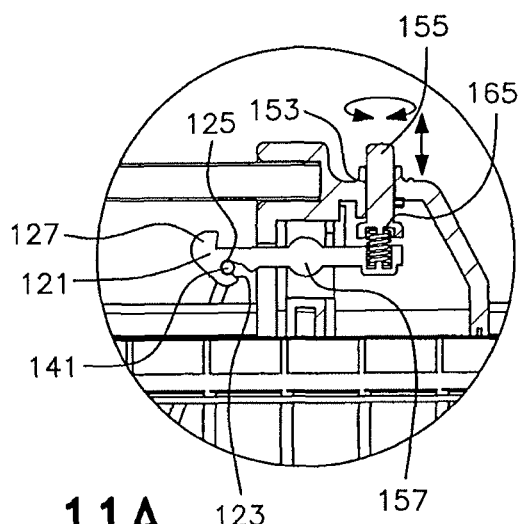
FIG. 12 is an enlarged view of the detail highlighted in FIG. 10.
Figure 11A:
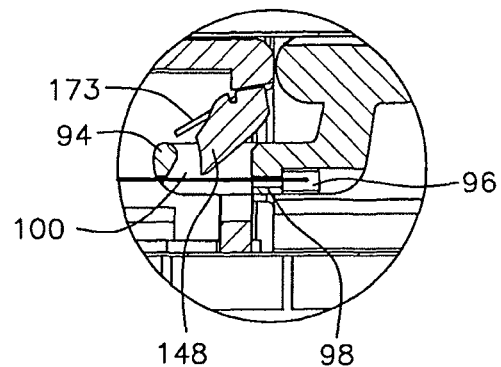
FIG. 11A is an enlarged view of the detail highlighted in FIG. 11.
Figure 6:
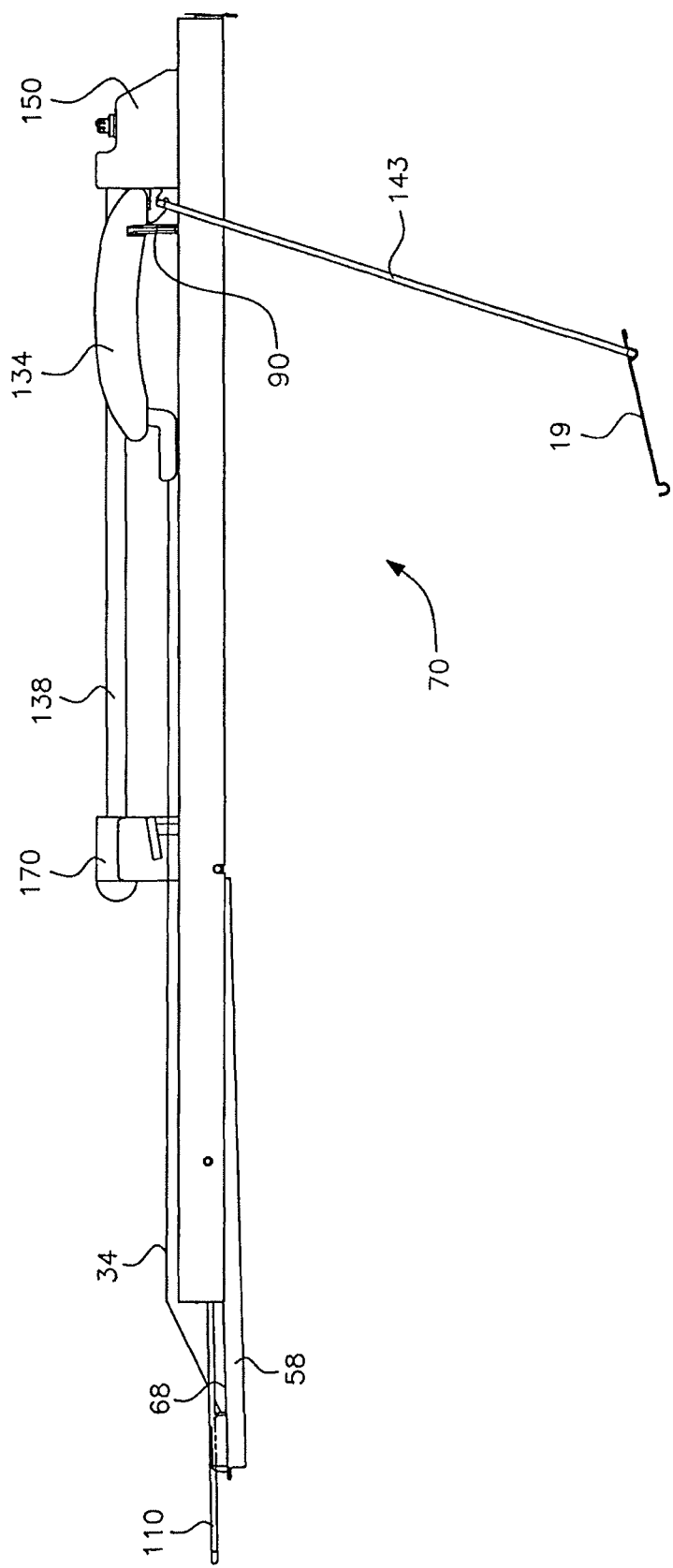
FIG. 6 is a right side view of the embodiment of FIG. 1 with the wire mesh removed to more clearly show the trap in a set position.
Figure 7:
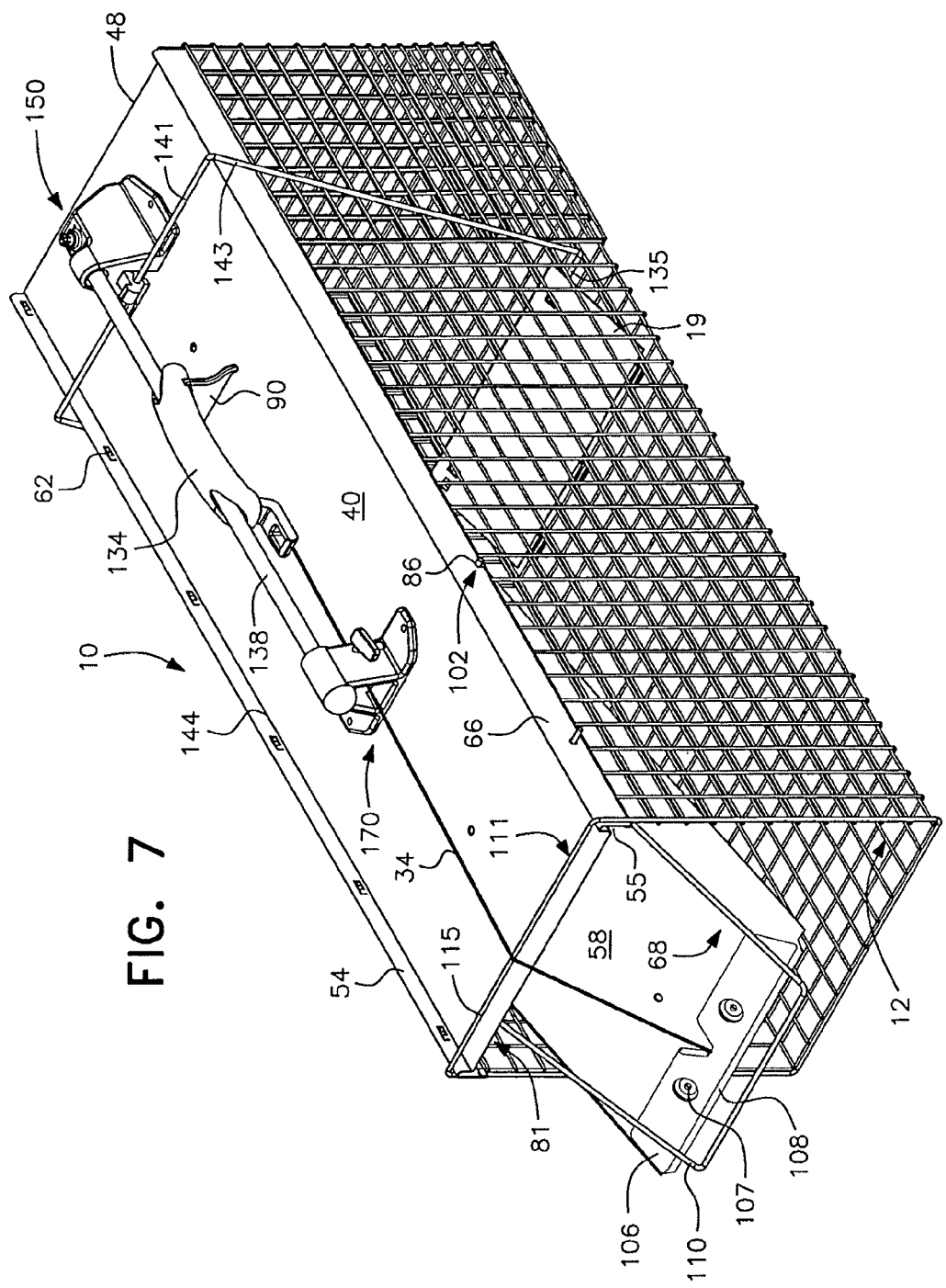
FIG. 7 is a perspective view of the trap of FIG. 1 in an intermediate position with the door half way between the opened and closed positions.

As shown in FIGS. 5 and 10-12, the rear portion 118 of the hand grip 134 contains a recess 116 and a vertically oriented support member 90 that glides along the roof surface as the grip slides along the rod 138. The front end of the grip 134 contains a forwardly extending handle cable pocket 100. As shown in FIGS. 11 and 11A, the pocket 100 consists of a longitudinally extending bore 98 that receives the other end of the cable 34. This end of the cable is held in place also through a wire crimp 96. The forwardmost portion of the handle cable pocket 100 contains a transverse cross piece 94 which, as will be explained later, engages with the front actuating assembly to provide a safety lock to prevent the hand grip 134 from sliding rearwardly, thereby insuring that the door of the trap stays closed during transport.

The recess 116 defined in the rearward end 118 of the handle 134 is defined in part by an indented ledge 92 that is shaped to mate with a rear latch 157 in a manner to be described hereinafter.

With reference to FIGS. 10-12, and 19, the front actuating assembly, generally designated by reference numeral 170, consists of basically four parts, a front housing 172, a front paddle mechanism 171 that is movably mounted within the housing, and a torsion wire spring 173 that is secured to the front paddle to bias the paddle in the downward direction relative to the front actuating assembly 170.

Figure 19:
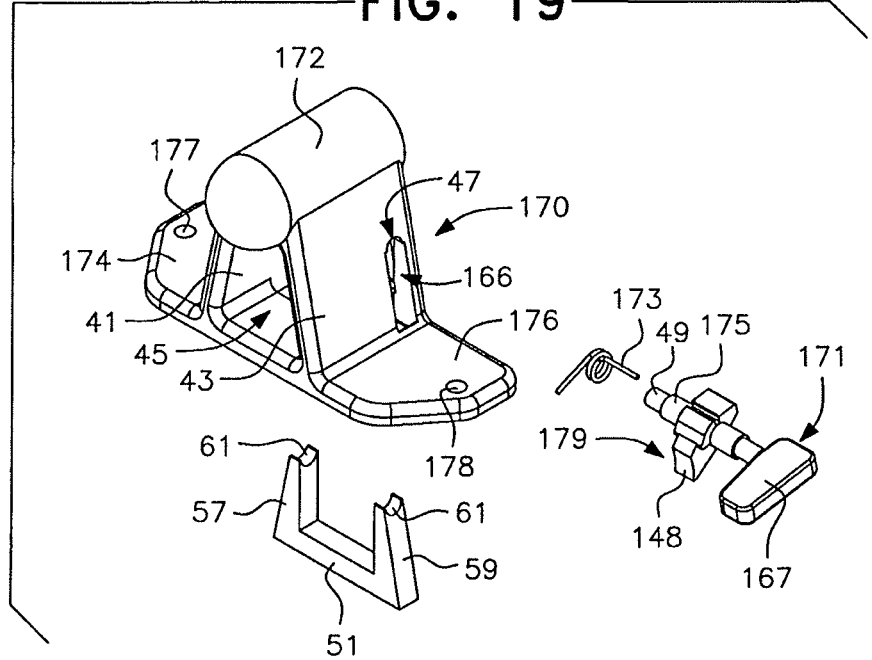
FIG. 19 is an exploded perspective view of a front actuating assembly forming part of the present invention.
Figure 20:
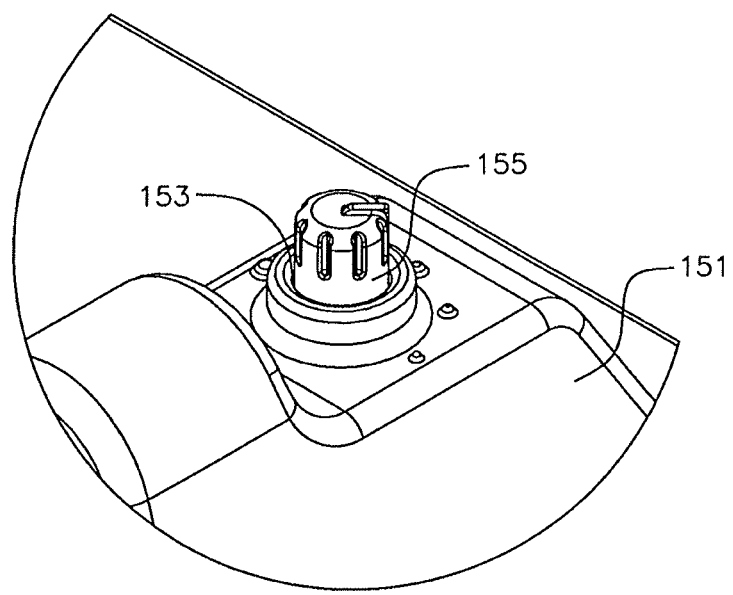
FIG. 20 is a partial view of the top of a rear latch assembly forming part of the present invention.
Figure 21:
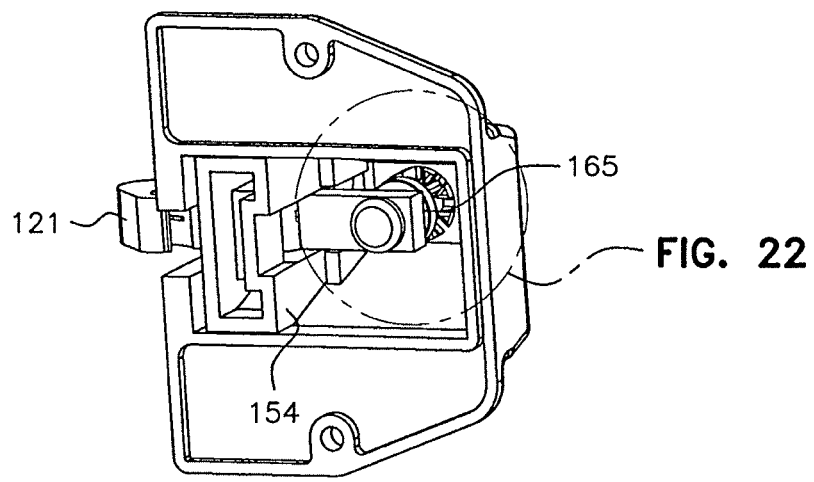
FIG. 21 is a bottom perspective view of the rear latch assembly shown in FIG. 20.
Figure 22:
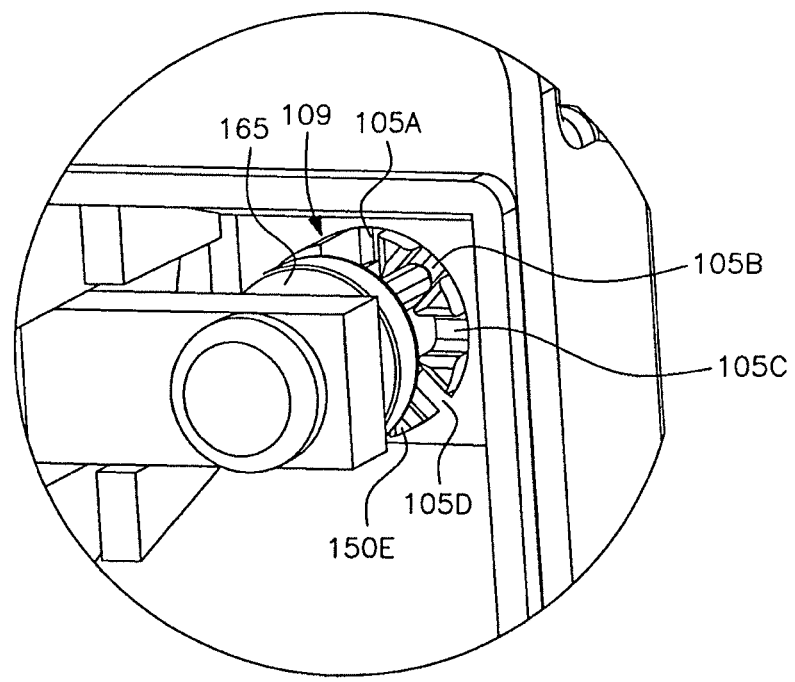
FIG. 22 is a closeup of a portion of the rear latch assembly as shown in FIG. 21.

As best seen in FIG. 19, the front paddle mechanism 171 consists of a cylindrical shaft 175 which terminates in a paddle handle 167 that can be moved by the thumb or fingers of the user in order to rotate the front paddle 171. About half way along the cylindrical axis of shaft 175, an engaging foot 179 is defined. The engaging foot contains an extended downwardly projecting toe 148 which, in use, engages with the cross bar 94 of the hand grip 134 in order to hold the handle in place after the trap has been tripped and the door panel is closed. With reference to FIG. 11A, it can be seen that the spring 173 biases the engaging foot 179 into the area 100 defined behind the cross bar 94 in the hand grip 134.

FIG. 19 shows how the front actuating assembly 170 may be assembled. As oriented in FIG. 19, the cylindrical housing 172 is supported on a pair of downwardly-extending walls 41 and 43 that mate respectively with mounting wings 174 and 176. Each of the walls contains a cutout 166 that is sized to allow passage of the engaging foot 179 from outside the actuating assembly 170 into a space 45 defined between the walls 41 and 43. The top 47 of each cutout defines half of a round hole to receive the smaller cylindrical portions of shaft 49. A U-shaped wedge 51 is inserted from underneath the housing 172 so that each leg 57 and 59 fills the spaces 166. The top 61 of each leg is shaped to complete the round hole for rotatably receiving the portions 49 of shaft 175.

With reference to FIGS. 5, 12, 17 and 20-23, the rear latch assembly 150 consists of essentially five pieces. The first piece is a rear housing 151. At the aft end of the rear housing there is a vertically extending bore 153 which is sized to receive a cylindrically shaped spring tensioner 155. Defined within the interior of the rear housing 151 is an opening to receive a rear latch 157. A rear housing insert 159 holds the latch 157 in place so that it may rotate about a transverse axis B. The rear end of the rear latch 157 contains a bore 161 for receiving one end of a compression spring 163. The other end of the compression spring in received within a cylindrical indentation 165 formed in the bottom of the spring tensioner. The forward end of the rear latch 157 contains a latching mechanism 121. This latching mechanism includes a downwardly projecting hook 123 having an opening 125 for receiving and holding the top section 141 of a rectangular-shaped yoke wire member 143 that has its free ends 135 and 137 secured to pedal 19 near the top edge by bent tabs 82 and 84, respectively.

The pedal 19 serves as the trip mechanism in accordance with the present invention. The bottom end of pedal 19 is rotatably secured to the bottom of the cage by bent crimps 79 which are evenly spaced along the bottom edge and bent around one of the wires of the wire mesh. The front end of the rear latch also includes a ledge 127 for receiving and holding the latch portion 92 at the rear 118 of the hand grip 134.

In order to set the trap 10, it is first placed on the ground or supporting surface. The front paddle 171 of the front actuating assembly 170 is then rotated in a clockwise direction by the user manipulating paddle handle 167, thus rotating the engaging foot 179 out of the cross bar opening 100 of the hand grip 134. This allows the user to move the handle along the longitudinal axis of the rod 138 in a rearward direction toward the rear latch assembly 150 with one hand, while the handle grip is also supported by the glide member 90. It is again noted that in the embodiment set forth representatively in FIGS. 1, 2, 8, 10 and 13, the actuating cable 34 passes underneath the lower portion 112 of the locking wire yoke 110. This arrangement of components assures that the locking wire yoke 110 automatically disengages from the lock plate 106 as the hand grip 134 is moved away from its forward position adjacent the front actuating assembly 170. Accordingly, a trapped animal can be released by a person located at the rear of the trap by disengaging the hand grip 134 from the front actuating assembly 170 and moving the hand grip 134 rearwardly on rail 138.

In the alternate embodiments shown in FIGS. 28 and 29, the hinged member 204, 304 of the actuating mechanism 200, 300 lies underneath the lower portion 112 of the locking wire yoke 110, with the flexible actuating member 202 being connected to the free end 210, 310 of the hinged member 204, 304 so that tensioning of the actuating member 202 lifts the hinged member to release the yoke. As noted earlier hereinabove, eliminating the need to pass the actuating member under the yoke prevents any frictional resistance between the flexible actuating member and the yoke, and the resulting wear on the actuating member, ensuring easy release of the yoke throughout the trap's operative life span when the actuating member is tensioned.

Once the hand grip 130 is released from the front assembly 170, the grip 134 can be moved rearwardly until the recess 116 of the grip engages the upward portion of the latch 127 so that the latch holds the handle in its rearwardmost position. Rearward movement of the handle 134 results in the cable 34 moving in a rearward direction to rotate the door 58 about ends 86 and 88 in an upward direction and set the door in a loaded position. Having accomplished this action with one hand, the trap is now set awaiting the entrance of an animal to activate the trap.

Figure 5:
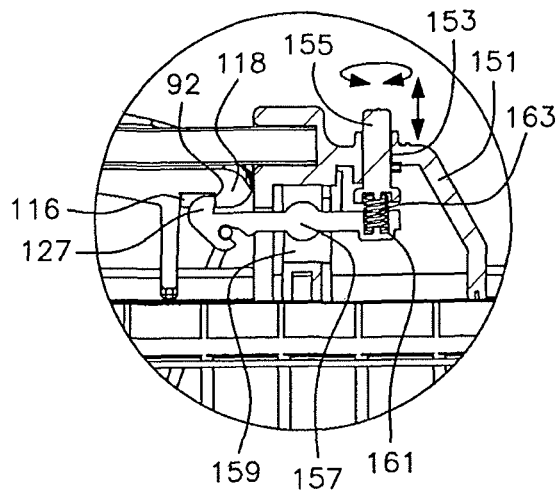
FIG. 5 is an enlarged view of the detail highlighted in FIG. 3.

With reference to FIGS. 1 and 5, in order to entice the animal into the trap, a suitable bait is inserted into the interior of the trap aft of the pedal 19. When the animal enters the trap and steps on the pedal 19, the pedal is rotated in a downward direction which causes the top section 141 of the yoke or trigger rod 143 to pull the latch 121 in a downward direction thereby releasing the recess 116 of handle 134 from engagement with the latch ledge 127. When this happens, the weight of the door 58 causes the door to rotate in a downward direction to rapidly close the interior space 70 and trap the animal within the cage 10.

As used herein, the term "trigger rod" is intended to have its broadest meaning and can include cable or other trigger mechanisms to release handle 134 from latch ledge 127 when pedal 19 is rotated to its downward position. In addition, those skilled in the art can appreciate that the trigger rod 143 could be a single rod and could be formed with latch mechanism 121 as one piece, such as by molding; and the pedal 19 could also be integral with the rod 143. Other trip mechanisms with which the animal interacts, as by pulling, could be substituted for pedal 19 and be formed as part of the trigger rod.

Figure 8:
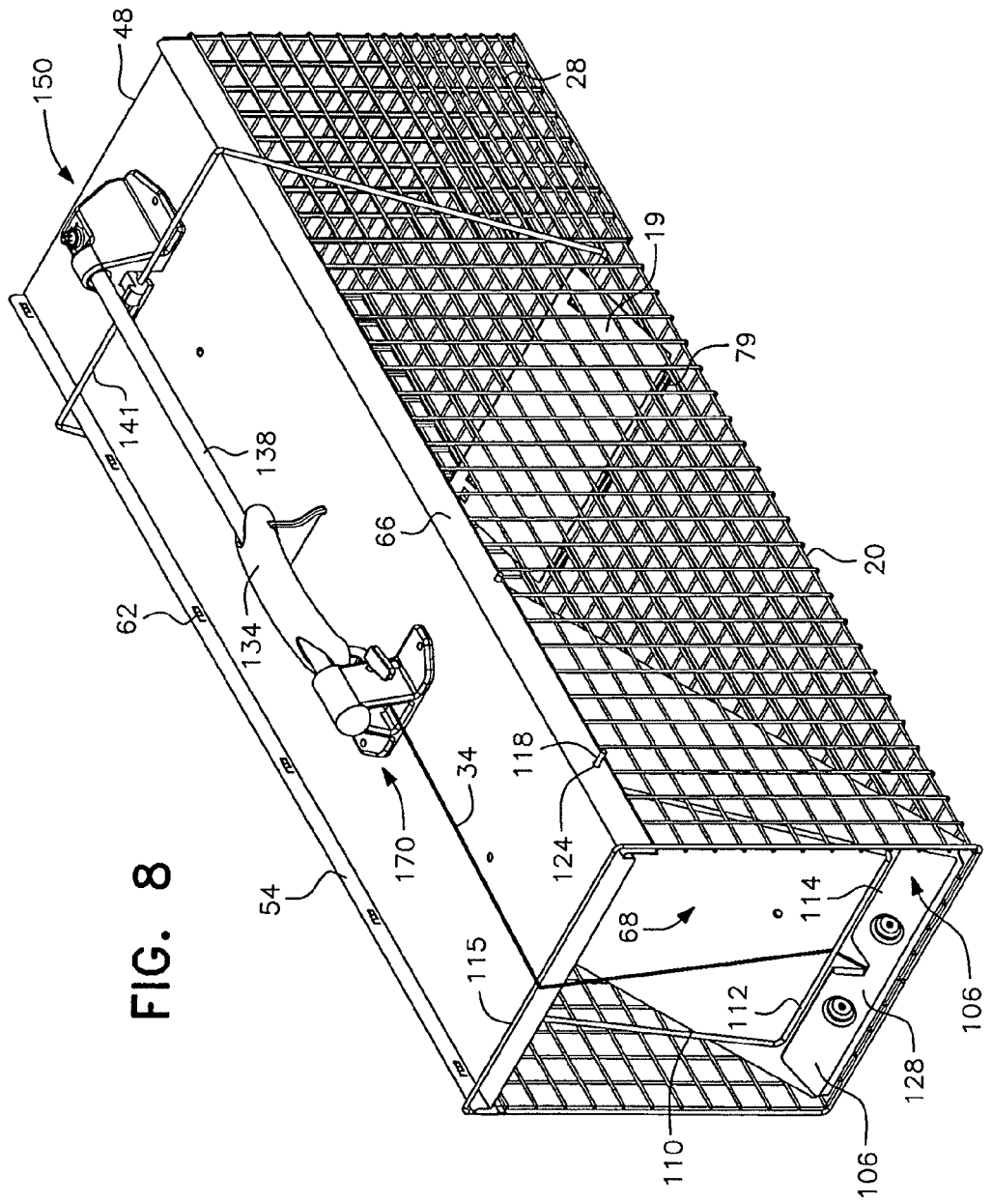
FIG. 8 is a perspective view of the trap of FIG. 1 in a tripped position with the door closed.
Figure 9:
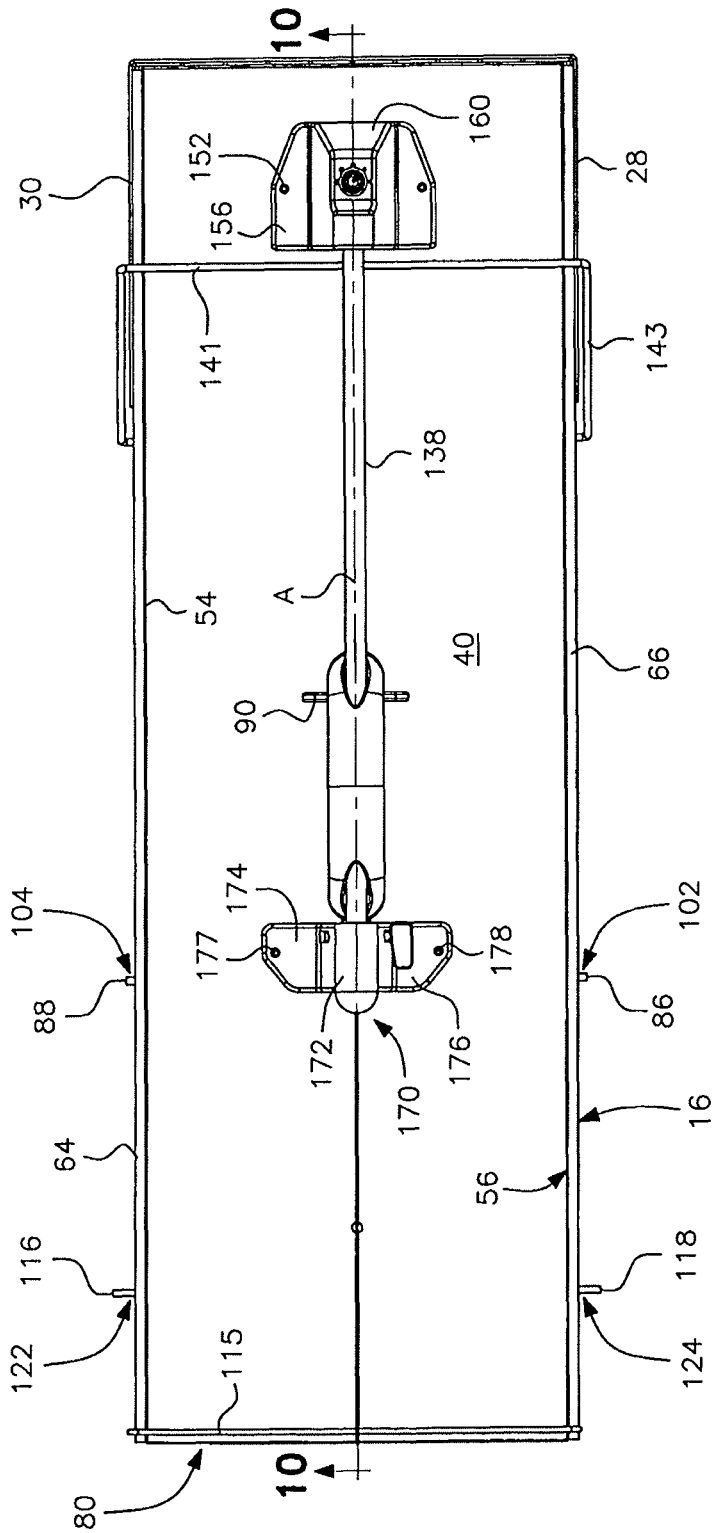
FIG. 9 is a top view of the embodiment shown in FIG. 8.
Figure 18:
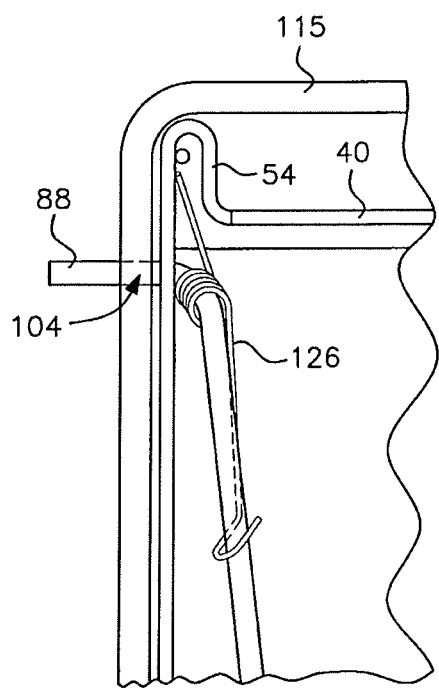
FIG. 18 is a fragmentary view of a spring used in the door mechanism of the embodiment of FIG. 1.

Downward rotation of the door 58 also moves the handle grip 134 to its forwardmost position with cross-piece 94 moving past engaging foot 179, to lock the hand grip 134 into the front actuating assembly. At the same time, as best seen in FIGS. 8 and 18, the downwardly biased yoke 112 through the urging of torsion spring 126 presses up against the top surface 68 of door 58 and is lodged in the corner created by the upper edge 114 of the door lock plate 106 and the top surface 68 of the door when the door is in the closed position. Under these conditions, if the animal tries to open the door, the bottom of the yoke will press against the door lock plate, preventing the animal from rotating the door in an upward direction.

When the user desires to release a trapped animal, the user follows a procedure similar to setting the trap. The engaging foot 179 of the front actuating assembly 170 is disengaged from the handle cable pocket 100 at the front end of the hand grip 134 by the user manipulating the paddle handle 167. The grip 134 is then free to slide rearward on rail 138 by the user's hand to open the door 58 by the pulling action of cable 34. Initial rearward movement of the grip 134 tensions the actuating cable 34 which causes the locking yoke 110 to be lifted in an upward direction disengaging from the top edge 114 of the door lock plate 106 by the urging of the end 132 of the actuating cable 34. Sliding the grip 134 to its most rearward position engages the grip to the latch mechanism 150 which resets the trap.

Figure 30A:
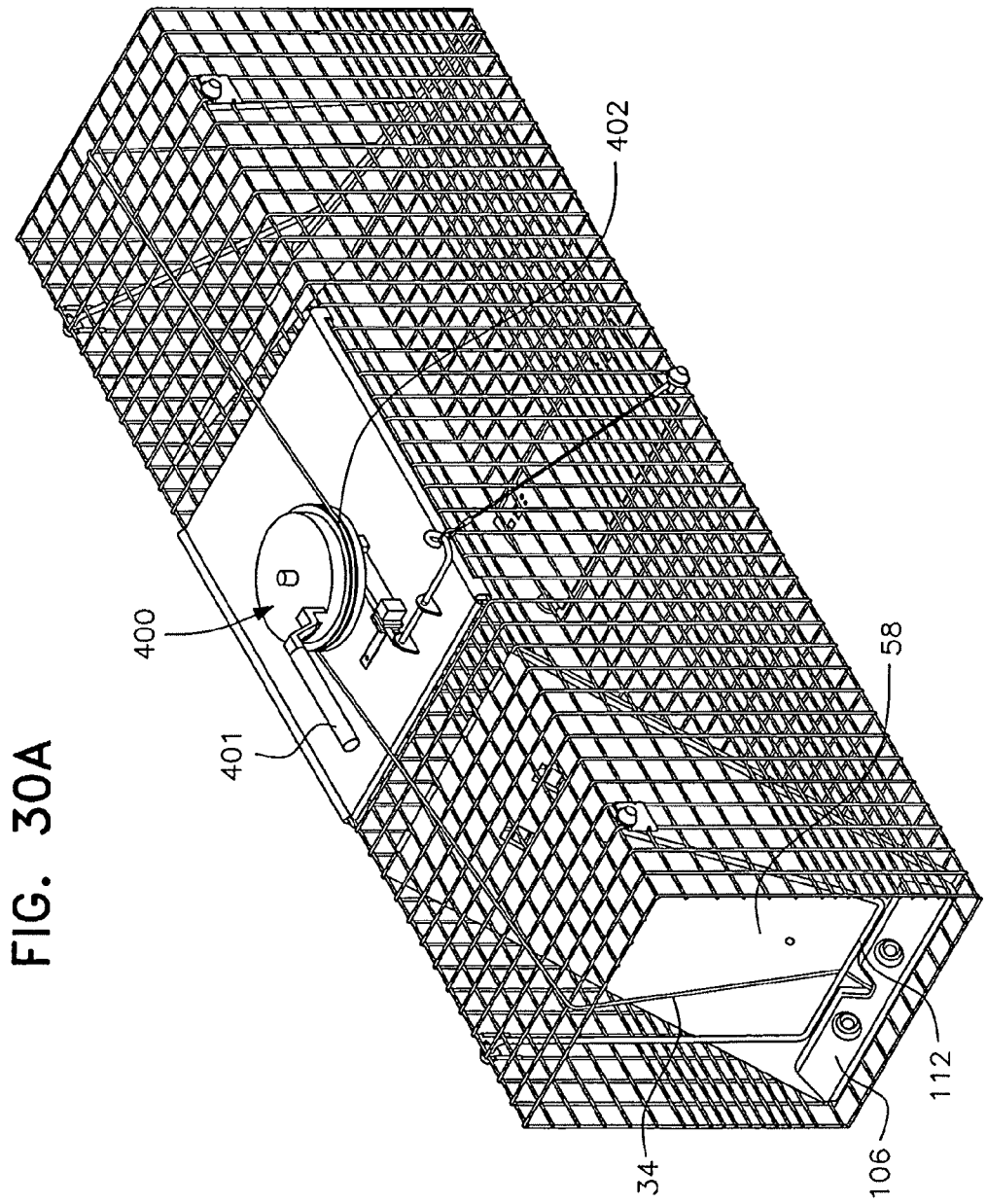
FIG. 30A is a perspective view of an alternate embodiment of the tensioning mechanism shown with the trap in a tripped position with the door closed.
Figure 30B:
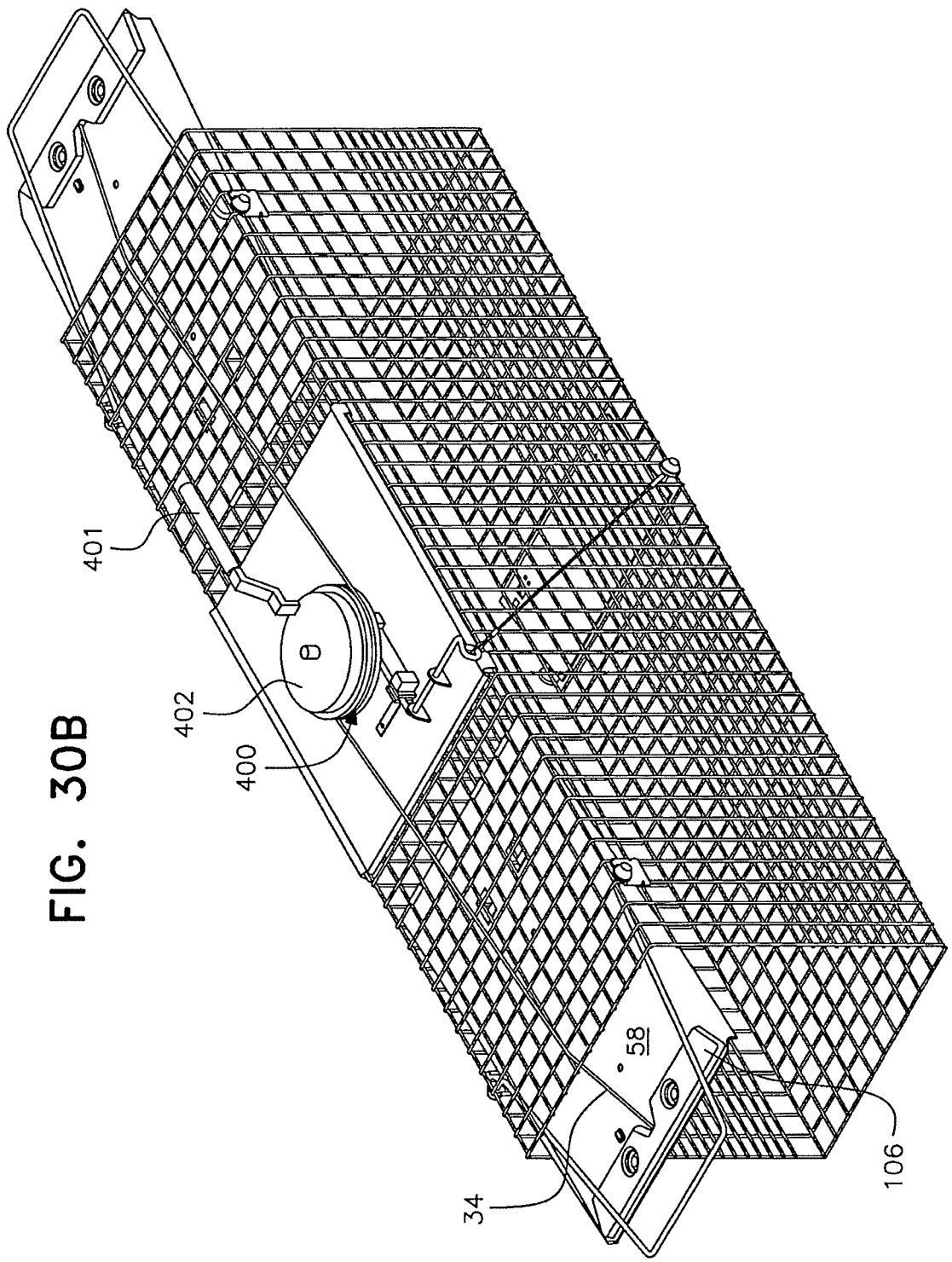
FIG. 30B is a perspective view of the trap of FIG. 30A in a set position with the door closed.

In a similar manner, tensioning mechanisms other than the hand grip such as a cable reel, crank, etc., can be used to tension the flexible actuating member. A cable reel trap design is shown in FIGS. 30A and 30B, with the door in the closed and open/set positions, respectively. With the door in the closed position as shown in FIG. 30A, the cable reel, generally designated by the reference numeral 400, can be wound in a manner known in the art such as by crank arm 401 to draw the actuating member 34 around a reel or spool 402, lifting the door 58 to the trap set position shown in FIG. 30B. A latch mechanism associated with the tensioning mechanism in a manner similar to that of latch mechanism 150 is then operative to release the tensioning mechanism, allowing the trap door to close.

Figure 31A:
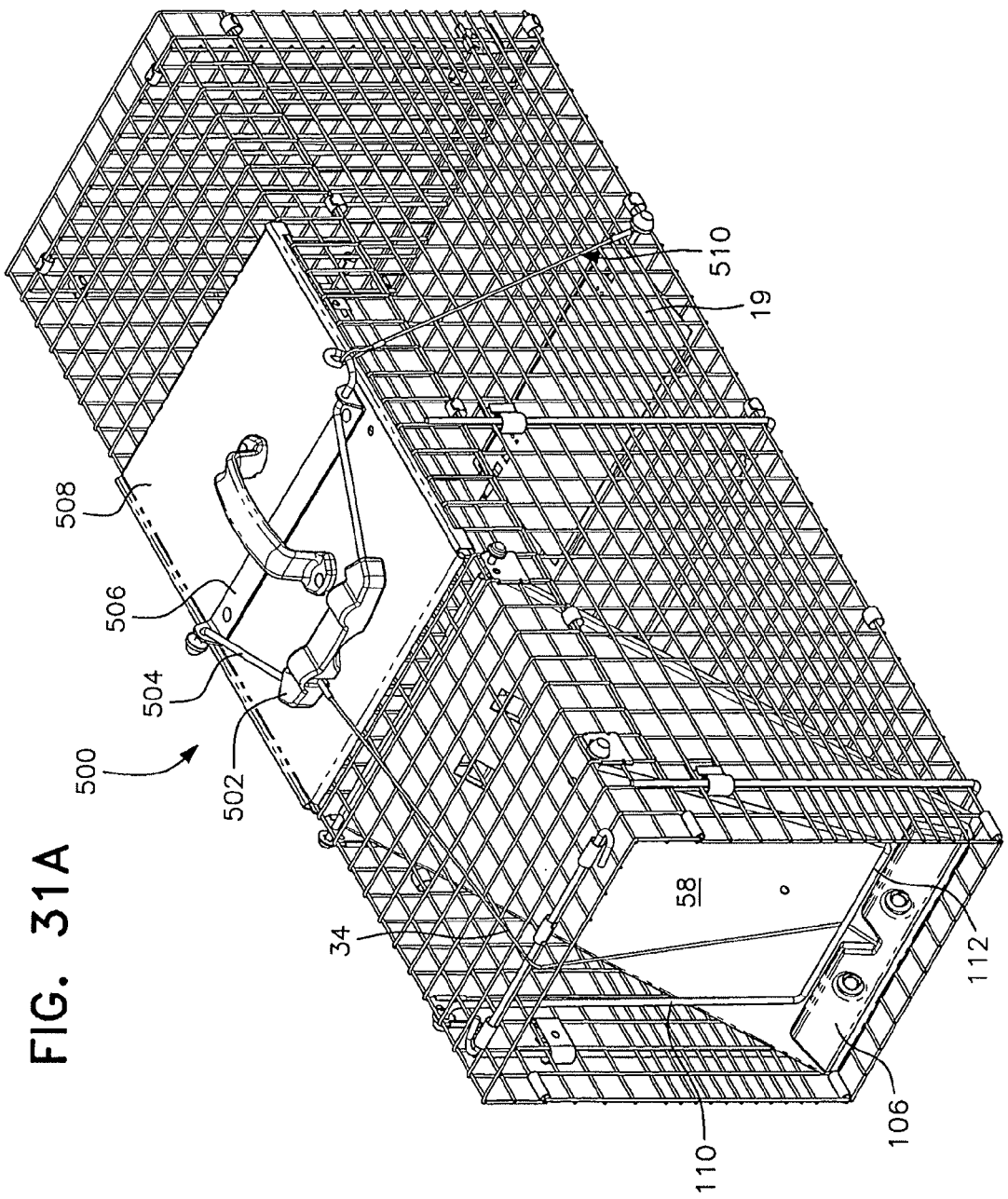
FIG. 31A is a perspective view of a further alternate embodiment of the tensioning mechanism shown with the trap in a tripped position with the door closed.

A further tensioning mechanism in the form of an over-center set mechanism, generally designated by the reference numeral 500, is shown in FIGS. 31A and 31B and is fully described in the present assignee's co-pending application, Ser. No. 11/600,085 ("the '085 application"), the priority of which has been claimed herein. The disclosure of the '085 application is hereby expressly incorporated herein by reference as if fully set forth in its entirety.

The over-center set mechanism 500, as described in the '085 application, includes a grip 502 with a set lever 504 rotatably coupled to a center bracket 506 on the top 508 of the trap. With the door 58 in the closed position (see FIG. 31A), the grip 502 is moved from the entrance side of the center bracket 506, as shown in FIG. 31A, to the back side of the center bracket (see FIG. 31B). This movement lifts the door 58 to the trap set position shown in FIG. 31B. In addition to setting the trap, the over-center set mechanism 500 also provides the latching function once the set lever 504 with grip 502 has been moved "over center" to the position shown in FIG. 31B.

Once latched, release of the set mechanism is triggered through the trip rod assembly, generally designated by the reference numeral 510. Opposing force applied by the trip pedal 19 lifts the grip 502 and set lever 504 to a position past the "over center" point after which the set lever proceeds rapidly toward the entrance side of the trap to allow the door 58 to close.

Figure 23:
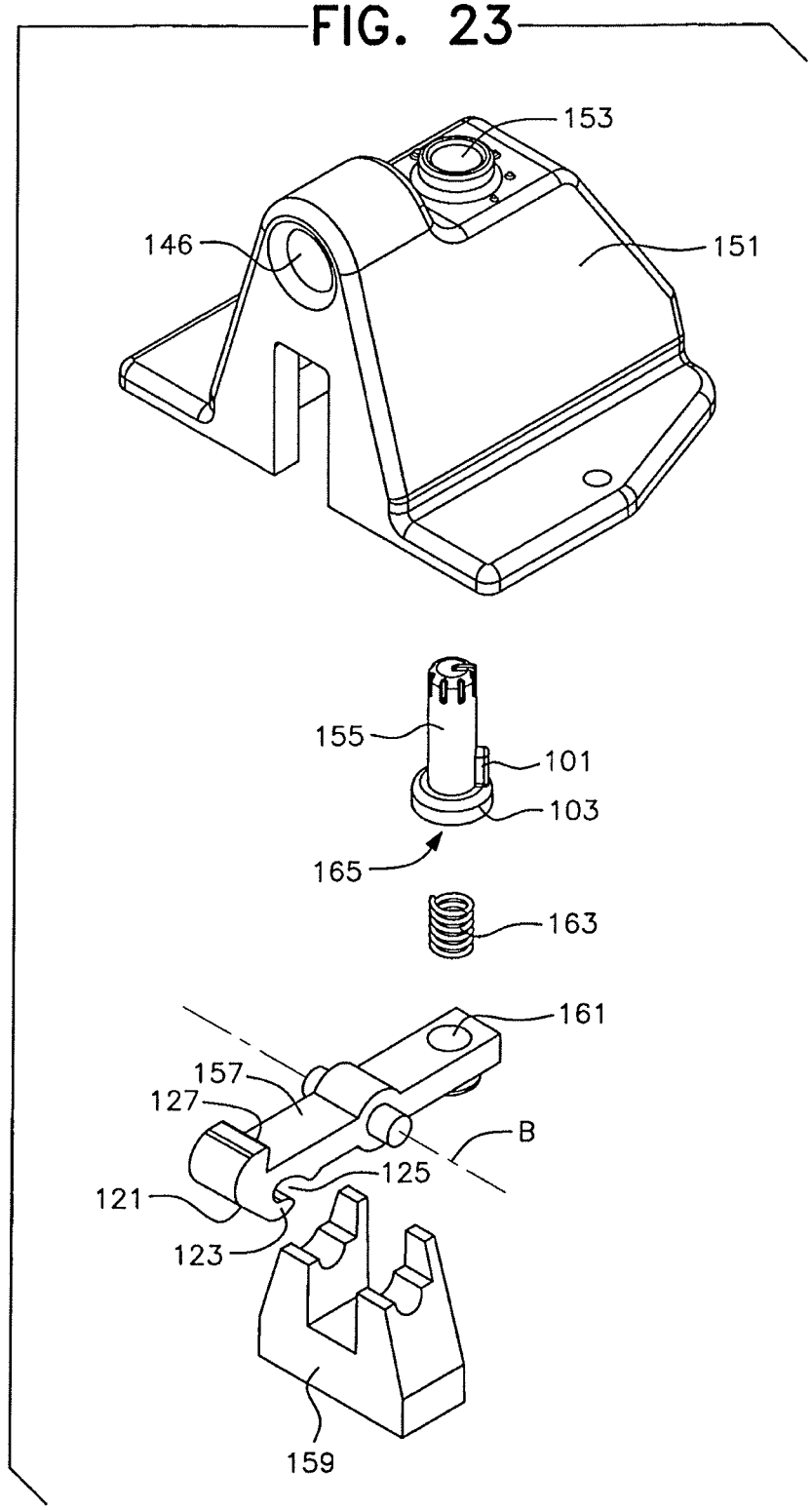
FIG. 23 is an exploded perspective view of the rear latch assembly forming part of the present invention.

Another feature of the present invention is an adjustable pedal sensitivity feature. This is accomplished, as shown in FIG. 23, by providing an upwardly extending ledge 101 near the bottom circumferential ledge 103 of the spring tensioner 155. When the spring tensioner 155 is rotated within the vertically extending bore 153, the compressive force on the spring 163 may be changed by the displacement of the spring tensioner 155 in a downward direction against one end of the spring 163 based on the clearance provided within the assembly through the use of a series of indentations 105A-105E positioned radially about the bottom 109 of the bore 153 within the rear housing 151. In this way, the tension required on the pedal to activate the trap can be adjusted so that if a small animal enters the trap, the weight of the animal will not trip the trap.

Figure 27:
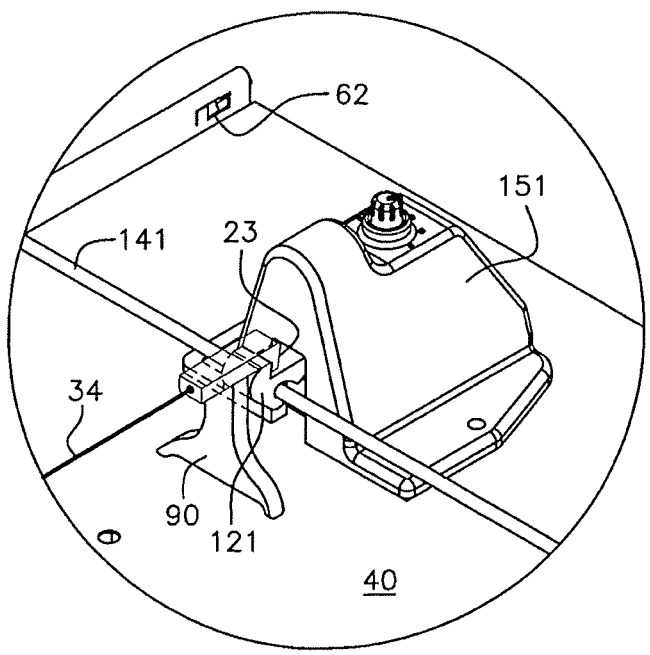
FIG. 27 is a fragmentary view of an alternative embodiment of the latching mechanism forming part of the present invention.

It is to be understood that the present invention is not limited to the illustrated embodiments described herein. Modifications and variations of the above described embodiments of the present invention are possible as appreciated by those skilled in the art in light of the above teachings. For example, as shown in FIG. 27, the moving hand grip 134 and rail 138 system could be eliminated. The cable 34 could terminate in a simple hook 23 at the latch end. The hook structure would include glide member 90 to support the hook to facilitate tripping the trap. This embodiment would not be as user friendly and would require a separate carrying handle but does work for functionality. In addition, the pedal 19 and trigger rod 143 could be replaced with a combination bait holder/rod that would activate the latching mechanism when it was pulled or moved a certain distance. Therefore, it is not desired to limit the invention to the specific examples disclosed or the exact construction and operation shown and described. Rather, all suitable modifications and equivalents may be resorted to, falling within the scope of the invention.

What is claimed is:

1. An animal trap comprising:
    an animal enclosure having a roof and an animal access opening into a vacant interior sized to receive an animal to be trapped;
    a door mounted at the access opening and movable between a set position in which the door is open to reveal the animal access opening and a closed position in which the door blocks the animal access opening;
    a latch mechanism having a hold position and a release position, said latch mechanism being operatively coupled to said door by a flexible member to secure said door in the set position when the latch mechanism is in said hold position;
    a trip mechanism movably mounted in the interior of the animal enclosure;
    a trigger mechanism between the trip mechanism and the latch mechanism so that when an animal enters the interior of the animal enclosure and moves the trip mechanism from a first position to a second position, the trigger mechanism causes the latch mechanism to move to the release position and allow the door to move from the set position to the closed position thereby trapping the animal in the animal enclosure; and
    a door lock automatically engaging with a lower end of said door when the door moves to the closed position to prevent the door from being opened by a trapped animal, said door lock automatically disengaging from said door lower end when a user moves the door to the set position.

2. The animal trap of claim 1, wherein said door lock includes a movable member in abutment with an outer side of said door lower end when the door is closed.

3. The animal trap of claim 2, further comprising a hinged member in engagement with said door lock and lying under said movable member, said hinged member including a base piece secured to said door and a flap that is pivotally movable with respect to said base piece, said flap pivoting in response to tensioning of said flexible member to lift said movable member and release said door lock.

4. The animal trap of claim 3, wherein said flexible member is coupled to said flap.

5. The animal trap of claim 4, wherein said flap is an elongated panel that extends substantially across a width of said door.

6. The animal trap of claim 1, wherein said door lock includes a movable member in abutment with said door when the door is closed, said flexible member passing under said movable member.

7. The animal trap of claim 6, wherein said flexible member is a cable.

8. The animal trap of claim 1, wherein said latch mechanism includes a crank that winds said flexible member on a spool when tensioning said flexible member.

9. The animal trap of claim 1, wherein said latch mechanism includes a hand grip movable between a first position and a second position so that when the hand grip is in the first position the door is in the closed position and when the hand grip is in the second position the door is in the opened position; and said latch mechanism configured to releasably hold the hand grip in its second position.

10. The animal trap of claim 9, wherein said hand grip can be moved from said first position to said second position by a single hand of a user to tension said flexible member and move the door to an open position.

11. The animal trap of claim 9, wherein said hand grip automatically moves from said second position to said first position when said latch mechanism is released and said door moves to said closed position.

12. The animal trap of claim 9, wherein movement of said hand grip away from said first position automatically disengages said door lock from said door by tensioning said flexible member.

13. An animal trap comprising:
    an animal enclosure having an animal access opening into a vacant interior sized to receive an animal to be trapped;
    a door movably mounted at the access opening, the door operative in an opened position to reveal the animal access opening and in a closed position to block the animal access opening, said door being in said opened position when said trap is in a set condition;
    a latch mechanism having a hold position and a release position, said latch mechanism being operatively coupled to said door to secure said door in the opened position when the latch mechanism is in said hold position and to allow the door to move to said closed position when the latch mechanism moves to said release position; and
    a trigger mechanism, responsive to an animal being in the trap, configured to initiate movement of the latch mechanism from the hold position to the release position and allow the door to move from the opened position to the closed position thereby trapping the animal in the animal enclosure, said trigger mechanism including a trip member with an adjustable sensitivity level.

14. The animal trap of claim 13, further comprising a door lock in abutment with an outer surface of said door to prevent the door from being opened by a trapped animal, a flexible member connecting the door to the latch mechanism being engaged with said door lock when the door is closed, said flexible member being coupled to a hinged member that underlies said door lock.

15. The animal trap of claim 14, wherein said hinged member includes a base piece secured to said door and a flap that is pivotally movable with respect to said base piece, said flap pivoting in response to tensioning of said flexible member to lift and release said door lock.

16. An animal trap comprising:
    an animal enclosure having an animal access opening into a vacant interior sized to receive an animal to be trapped;
    a door pivotally mounted at the access opening, the door operative in an opened position to reveal the animal access opening and in a closed position to block the animal access opening, movement from said opened position to said closed position being downward;
    a set mechanism mounted to a top of said animal enclosure and operatively coupled to said door, said set mechanism being movable through a range of movement while staying on said top for securing the door in the opened position when the set mechanism is in a set position and for allowing the door to move to said closed position when the trap is tripped, said set mechanism including a component for holding said set mechanism in the set position;
a trip mechanism responsive to movement of an animal in the interior of the animal enclosure; and
a tripping assembly responsive to activation of the trip mechanism for moving the holding component and releasing said set mechanism out of its set position to enable the door to move downwardly from the opened position to the closed position.

17. The animal trap of claim 16, wherein said holding component includes a pivotally mounted element that releases the set mechanism out of its set position when said element is pivotally moved.

18. The animal trap of claim 17, wherein said pivotally mounted element is spring tensioned to hold said set mechanism in the set position.

19. The animal trap of claim 18, wherein said pivotally mounted element has a hooked end.

20. The animal trap of claim 17, wherein said door is pivotally mounted along a top edge to the top of the animal enclosure, said animal trap further comprising a locking mechanism configured to engage a lower end of said door and operative when said door is in said closed position to prevent the door from being opened by a trapped animal.

* * * * *